US012143048B2

(12) United States Patent
Kawasaki et al.

(10) Patent No.: US 12,143,048 B2
(45) Date of Patent: Nov. 12, 2024

(54) FAN CONTROL SYSTEM, FAN SYSTEM, ACTIVE INGREDIENT GENERATION SYSTEM, FAN CONTROL METHOD, AND PROGRAM

(71) Applicant: Panasonic Intellectual Property Management Co., Ltd., Osaka (JP)

(72) Inventors: Motoji Kawasaki, Shiga (JP); Kouiti Hirai, Shiga (JP); Mikio Ito, Shiga (JP); Yutaka Uratani, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 127 days.

(21) Appl. No.: 17/996,484

(22) PCT Filed: Feb. 25, 2021

(86) PCT No.: PCT/JP2021/007146
§ 371 (c)(1),
(2) Date: Oct. 18, 2022

(87) PCT Pub. No.: WO2021/229892
PCT Pub. Date: Nov. 18, 2021

(65) Prior Publication Data

US 2023/0231507 A1    Jul. 20, 2023

(30) Foreign Application Priority Data

May 15, 2020 (JP) ................................ 2020-086341

(51) Int. Cl.
*H02P 6/20* (2016.01)
*H02P 29/20* (2016.01)
*H02P 29/68* (2016.01)

(52) U.S. Cl.
CPC ................ *H02P 29/20* (2016.02); *H02P 6/20* (2013.01); *H02P 29/68* (2016.02)

(58) Field of Classification Search
CPC ............. H02P 29/20; H02P 6/20; H02P 29/68
See application file for complete search history.

(56) References Cited

U.S. PATENT DOCUMENTS 4,575,663 A 3/1986 Papson et al.
4,609,145 A * 9/1986 Miller ................. A01M 7/0014 239/223

(Continued)

FOREIGN PATENT DOCUMENTS

JP S61-106079 A 5/1986
JP H07-222480 A 8/1995

(Continued)

OTHER PUBLICATIONS

International Search Report issued on Apr. 20, 2021 in International Application No. PCT/JP2021/007146, with English translation.

(Continued)

*Primary Examiner* — Rina I Duda
(74) *Attorney, Agent, or Firm* — Rimon P.C.

(57) ABSTRACT

A fan control system according to the present disclosure includes a controller that selects a control mode from a plurality of control modes including a first mode and a second mode. The first mode is a control mode in which an electric signal is given to fan motor so that fan motor operates at the first rotation speed. The second mode is a control mode in which an electric signal is given to fan motor so that fan motor operates at a second rotation speed lower than the first rotation speed. The controller has a function of selecting the second mode in a period after the start of the fan motor and before the selection of the first mode.

19 Claims, 9 Drawing Sheets

(56) References Cited

U.S. PATENT DOCUMENTS

| | | | | |
|---|---|---|---|---|
| 5,225,759 | A | 7/1993 | Endo et al. | |
| 6,216,961 | B1 * | 4/2001 | Utter | B05B 7/0075 239/289 |
| 2011/0095716 | A1 * | 4/2011 | Hanyu | H02P 29/60 318/473 |
| 2012/0191250 | A1 * | 7/2012 | Iwata | H02P 6/06 700/275 |
| 2017/0101985 | A1 * | 4/2017 | Vos | F04B 39/066 |
| 2017/0252760 | A1 * | 9/2017 | Campbell | A45D 34/04 |

FOREIGN PATENT DOCUMENTS

| | | | |
|---|---|---|---|
| JP | 2003-219698 | A | 7/2003 |
| JP | 2013-063009 | A | 4/2013 |
| JP | 2013-072388 | A | 4/2013 |
| JP | 2014-059105 | A | 4/2014 |
| JP | 2017-099112 | A | 6/2017 |

OTHER PUBLICATIONS

The EPC Office Action dated Sep. 22, 2023 for the related European Patent Application No. 21804304.0.

* cited by examiner

FAN CONTROL SYSTEM, FAN SYSTEM, ACTIVE INGREDIENT GENERATION SYSTEM, FAN CONTROL METHOD, AND PROGRAM

CROSS-REFERENCE OF RELATED APPLICATIONS

This application is the U.S. National Phase under 35 U.S.C. § 371 of International Patent Application No. PCT/JP2021/007146, filed on Feb. 25, 2021, which in turn claims the benefit of Japanese Patent Application No. 2020-086341, filed on May 15, 2020, the entire disclosures of which Applications are incorporated by reference herein.

TECHNICAL FIELD

The present disclosure generally relates to a fan control system, a fan system, an active ingredient generation system, a fan control method, and a program. More particularly, the present disclosure relates to a fan control system, a fan system, an active ingredient generation system, a fan control method, and a program for controlling a fan motor having an impregnated bearing impregnated with a lubricant.

BACKGROUND ART

PTL 1 describes a fan motor (DC brushless motor fan) including an impregnated bearing (porous bearing) and a shaft that is inserted into the impregnated bearing and rotatably held. The fan motor further includes a rotor fixed to the shaft and having a permanent magnet and blades (fins). In this fan motor, the impregnated bearing is molded by sintering metal powder, and has a void (porous) for impregnating (containing) a lubricant (lubricating oil).

In this type of fan motor, the lubricant impregnated in the impregnated bearing realizes a lubricating action between the impregnated bearing and the shaft.

CITATION LIST

Patent Literature

PTL 1: Unexamined Japanese Patent Publication No. 2013-63009

SUMMARY OF THE INVENTION

In the fan motor as described above, when the impregnation amount of the lubricant in the impregnated bearing is less than an appropriate amount, for example, a defect such as abnormal noise due to shrinkage of the lubricant may occur under a special environment such as a low temperature environment.

The present disclosure has been made in view of the above circumstances, and an object of the present disclosure is to provide a fan control system, a fan system, an active ingredient generation system, a fan control method, and a program that are less likely to cause defects such as abnormal noise even in a special environment.

A fan control system according to one aspect of the present disclosure is a fan control system that controls a fan motor. The fan motor includes a rotor including blades, a stator, and an impregnated bearing impregnated with a lubricant, and rotatably holds the rotor by the impregnated bearing. The fan control system includes a controller that selects a control mode from a plurality of control modes including a first mode and a second mode. The first mode is a control mode in which an electric signal is given to the fan motor so that the fan motor operates at a first rotation speed. The second mode is a control mode in which an electric signal is given to the fan motor so that the fan motor operates at a second rotation speed lower than the first rotation speed. The controller has a function of selecting the second mode in a period after the start of the fan motor and before the selection of the first mode.

A fan system according to one aspect of the present disclosure includes the fan control system and the fan motor.

An active ingredient generation system according to one aspect of the present disclosure includes the fan system and a discharger that generates an active ingredient. The fan motor generates an air flow for releasing the active ingredient.

A fan control method according to one aspect of the present disclosure is a fan control method for controlling a fan motor, in which a control mode can be selected from a plurality of control modes including a first mode and a second mode. The fan motor includes a rotor including blades, a stator, and an impregnated bearing impregnated with a lubricant, and rotatably holds the rotor by the impregnated bearing. The first mode is a control mode in which an electric signal is given to the fan motor so that the fan motor operates at a first rotation speed. The second mode is a control mode in which an electric signal is given to the fan motor so that the fan motor operates at a second rotation speed lower than the first rotation speed. The fan control method includes a process of selecting the second mode in a period from the start of the fan motor to the selection of the first mode.

A program according to an aspect of the present disclosure is a program for causing one or more processors to execute the fan control method.

According to the present disclosure, there is an advantage that defects such as abnormal noise are less likely to occur even in a special environment.

DESCRIPTION OF EMBODIMENT

First Exemplary Embodiment

(1) Outline

Figure 1:
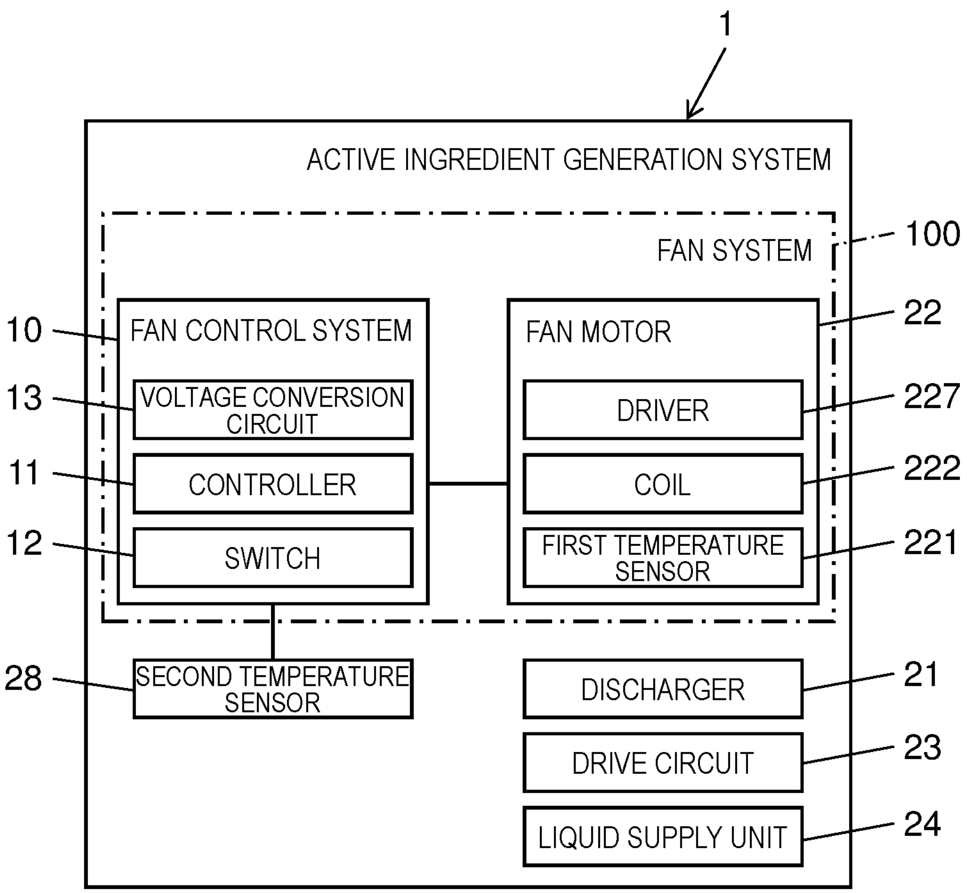
FIG. 1 is a schematic block diagram of an active ingredient generation system including a fan control system according to a first exemplary embodiment.

Hereinafter, an outline of fan control system 10, fan system 100, and active ingredient generation system 1 according to the present exemplary embodiment will be described with reference to FIGS. 1 to 3.

Active ingredient generation system 1 according to the present exemplary embodiment includes discharger 21, and generates an active ingredient in discharger 21. In the present exemplary embodiment, discharger 21 includes discharge electrode 211 (see FIG. 6B) and counter electrode 212 (see FIG. 6B), and discharge occurs when a voltage is applied between discharge electrode 211 and counter electrode 212. The "active ingredient" in the present disclosure is an ingredient generated by discharge in discharger 21, and means, for example, a charged microparticle liquid containing an OH radical, an OH radical, an $O_2$ radical, a negative ion, a positive ion, ozone, or a nitrate ion. These active ingredients are not limited to sterile filtration, odor removal, moisture keeping, freshness keeping, or virus inactivation, and are the basis for providing useful effects in various situations.

Active ingredient generation system 1 according to the present exemplary embodiment includes case 3 (see FIG. 5) in addition to internal component 2 (see FIG. 5) including discharger 21. Case 3 constitutes an outer shell of active ingredient generation system 1, and internal component 2 is accommodated in case 3 to constitute unitized active ingredient generation system 1. In case 3, discharge port 31 (see FIG. 5) for discharging an active ingredient and air supply port 32 (see FIG. 5) for taking air into case 3 are formed. In the present exemplary embodiment, internal component 2 further includes fan motor 22 (see FIG. 5). Fan motor 22 functions as an air blowing unit that generates an air flow (wind) flowing from air supply port 32 toward discharge port 31. As a result, the air taken into case 3 from air supply port 32 is discharged to the outside of case 3 from discharge port 31. The active ingredient generated in discharger 21 is discharged to the outside of case 3 from discharge port 31 on the air flow generated by fan motor 22 as such an air blowing unit.

Figure 2A:
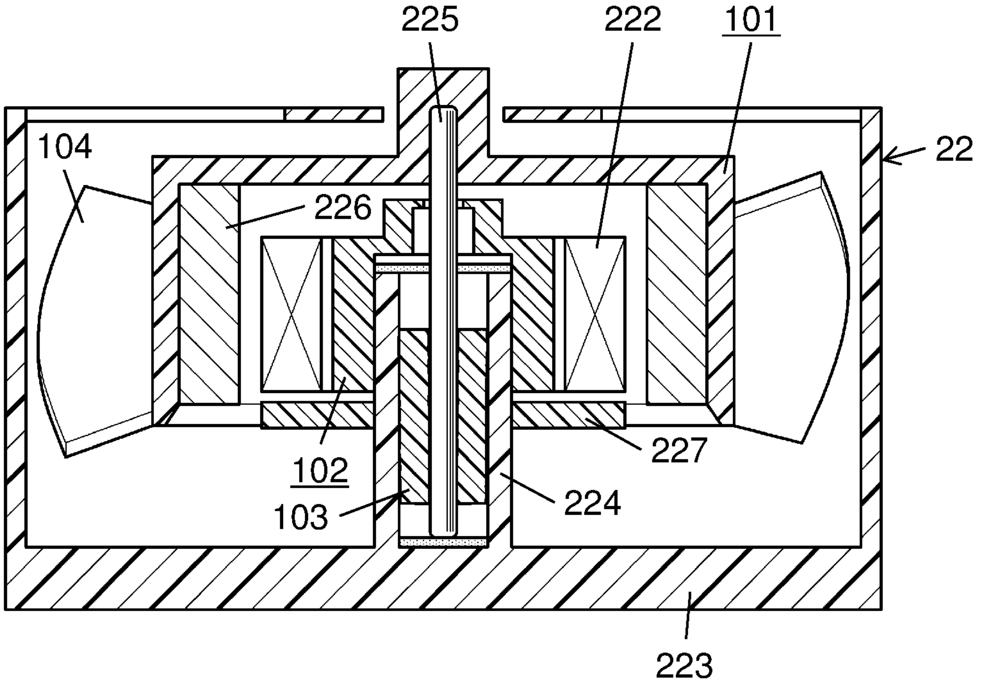
FIG. 2A is a schematic sectional view of a fan motor controlled by the fan control system.

In the present exemplary embodiment, as illustrated in FIG. 2A, fan motor 22 includes rotor 101, stator 102, and impregnated bearing 103. Rotor 101 includes blades 104. Impregnated bearing 103 is impregnated with lubricant 105 (see FIGS. 2B and 2C). As an example, impregnated bearing 103 is molded by sintering metal powder, and has a void (porous) for impregnating lubricant 105. Fan motor 22 rotatably holds rotor 101 by impregnated bearing 103. In this configuration, lubricant 105 impregnated in impregnated bearing 103 realizes a lubricating action between impregnated bearing 103 and rotor 101.

Fan control system 10 according to the present exemplary embodiment is a system that controls fan motor 22, which is a control target, with fan motor 22 including impregnated bearing 103 as described above as a control target. That is, fan control system 10 includes rotor 101 including blades 104, stator 102, and impregnated bearing 103 impregnated with lubricant 105, and controls fan motor 22 that rotatably holds rotor 101 by impregnated bearing 103. Fan control system 10 includes controller 11 that selects a control mode from a plurality of control modes including a first mode and a second mode. The first mode is a control mode in which an electric signal (first voltage V1 in the example of FIG. 3) is given to fan motor 22 so that fan motor 22 operates at a first rotation speed. The second mode is a control mode in which an electric signal (second voltage V2 in the example of FIG. 3) is given to fan motor 22 so that fan motor 22 operates at a second rotation speed lower than the first rotation speed. Controller 11 has a function (hereinafter, referred to as an "idling function") of selecting the second mode in a period (period T2 in the example of FIG. 3) after the start of fan motor 22 and before the selection of the first mode.

According to this configuration, the second mode is selected in a period after the start of fan motor 22 and before the selection of the first mode by the idling function of controller 11. Therefore, before fan motor 22 operates at the first rotation speed, fan motor 22 operates at the second rotation speed lower than the first rotation speed. Therefore, for example, even under a special environment such as a low temperature environment, impregnated bearing 103 is warmed while fan motor 22 operates at the second rotation speed, and a defect such as abnormal noise due to contraction of lubricant 105 is less likely to occur.

Fan control system 10 according to the present exemplary embodiment constitutes fan system 100 together with fan motor 22. In other words, fan system 100 according to the present exemplary embodiment includes fan control system 10 and fan motor 22. Fan control system 10 controls fan motor 22 by giving an electric signal to fan motor 22. That is, fan motor 22 operates in response to an electric signal from fan control system 10.

Fan system 100 according to the present exemplary embodiment constitutes active ingredient generation system 1 together with discharger 21 that generates an active ingredient. In other words, active ingredient generation system 1 according to the present exemplary embodiment includes fan system 100 and discharger 21. Discharger 21 generates the active ingredient. Fan motor 22 generates an air flow for releasing the active ingredient. That is, in active ingredient generation system 1, the active ingredient generated by discharger 21 can be efficiently released to the outside of case 3 on the air flow generated by fan motor 22 as the air blowing unit.

(2) Details

Hereinafter, details of fan control system 10, fan system 100, and active ingredient generation system 1 according to the present exemplary embodiment will be described with reference to FIGS. 1 to 7.

(2.1) Definitions

The term "impregnation" used in the present disclosure means, for example, a state in which a liquid or gel-like fluid is held in a gap of an object by immersing the liquid or gel-like fluid into the object having a porous structure or a fibrous structure having a large number of gaps (voids). That is, as an example, impregnated bearing 103 impregnated with lubricant 105 is molded by sintering metal powder, and has a porous structure having a large number of gaps for impregnating lubricant 105. By immersing the liquid or gel lubricant 105 into such impregnated bearing 103, lubricant 105 can be held in a large number of gaps of impregnated bearing 103. This state is referred to as a state in which impregnated bearing 103 is impregnated with lubricant 105.

The term "gel" as used in the present disclosure means a state having an intermediate property between a liquid and a solid, and includes a state of a colloid including two phases of a liquid phase and a solid phase. For example, a state called a gel or sol, such as an emulsion in which the dispersion medium is a liquid phase and the dispersoid is a liquid phase, or a suspension in which the dispersoid is a solid phase, is included in the "gel" state. In addition, a state in which the dispersion medium is a solid phase and the dispersoid is a liquid phase is also included in the "gel" state. That is, lubricant 105 with which impregnated bearing 103 is impregnated has a constant volume when the temperature and the pressure are constant, and is an object having a property as a fluid having no fixed shape. In other words, lubricant 105 with which impregnated bearing 103 is impregnated is a fluid (fluid) other than gas. "Fluid" as used herein includes both Newtonian and non-Newtonian fluids. In the present exemplary embodiment, as an example, impregnated bearing 103 is impregnated with liquid lubricant 105 made of a lubricating oil (oil) such as a synthetic oil or a mineral oil.

The "electric signal" in the present disclosure means a general signal that electrically transmits information, and includes not only a signal that transmits information by changing (modulating) amplitude, frequency, phase, or the like of a carrier wave, but also a signal that transmits information by the magnitude of a voltage or a current, for example. The electric signal includes both a digital signal and an analog signal. In the present exemplary embodiment, as an example, the electric signal used by fan control system 10 to control fan motor 22 is a DC voltage applied to fan motor 22. That is, the electric signal including the DC voltage applied to fan motor 22 can transmit information depending on the magnitude of the voltage, and fan motor 22 can be controlled by changing the magnitude of the voltage.

In addition, "integrated" in the present disclosure means an aspect in which a plurality of elements (parts) can be physically handled as one body. That is, the fact that the plurality of elements are integrated means that the plurality of elements are integrated into one and can be handled as one member. In this case, the plurality of elements may be in an integrally inseparable relationship like an integrally molded product, or a plurality of elements separately produced may be mechanically coupled by, for example, caulking, adhesion, welding, screw fixing, or the like. As an example, the upstream block and the downstream block included in air passage member 5 to be described later may be integrated in an appropriate manner.

Hereinafter, as an example, three axes of an X axis, a Y axis, and a Z axis orthogonal to each other are set. In particular, an axis along the longitudinal direction of case 3 is referred to as an "X axis", and an axis along a direction in which case 3 and lid body 4 (see FIG. 4A) are assembled is referred to as a "Z axis". The "Y axis" is an axis orthogonal to both the X axis and the Z axis and extending along a lateral direction of case 3. Further, a direction in which the active ingredient is released from discharge port 31 is defined as a positive direction of the X axis, and a side of case 3 viewed from lid body 4 is defined as a positive direction of the Z axis. In addition, hereinafter, the state viewed from the positive direction of the Z axis is also referred to as "plan view". Each of the X axis, Y axis, and Z axis is a virtual axis. Arrows denoted as "X", "Y", and "Z" in the figures are merely drawn, respectively, for better description, and do not represent axes as real entity. It should be noted that these directions are not intended to specify the direction of use of active ingredient generation system 1.

Hereinafter, as an example, it is assumed that active ingredient generation system 1 is for in-vehicle use. That is, active ingredient generation system 1 is disposed, for example, inside a dashboard or the like, and is used in such a manner that an active ingredient is released into a duct of an in-vehicle air conditioning facility and the active ingredient is released into the vehicle using an outlet of the air conditioning facility.

(2.2) Overall Configuration

First, an overall configuration of active ingredient generation system 1 according to the present exemplary embodiment will be described with reference to FIGS. 1 and 4A to 6B.

As illustrated in FIG. 1, active ingredient generation system 1 according to the present exemplary embodiment includes fan system 100 and discharger 21 that generates an active ingredient. Fan system 100 includes fan control system 10 and fan motor 22. Fan motor 22 included in fan system 100 functions as an air blowing unit that generates an air flow for releasing the active ingredient in active ingredient generation system 1.

Further, as described above, active ingredient generation system 1 according to the present exemplary embodiment includes case 3 in addition to internal component 2 including discharger 21. Case 3 is formed in a box shape having discharge port 31 for releasing the active ingredient. Active ingredient generation system 1 according to the present exemplary embodiment further includes lid body 4, buffer 41 (see FIG. 5), and air passage member 5 in addition to internal component 2 and case 3.

Lid body 4 is joined to case 3. Case 3 has opening 33 (see FIG. 5) separately from discharge port 31. Lid body 4 is joined to case 3 so as to close opening 33 in a state where internal components 2 are housed between lid body 4 and case 3. That is, case 3 is formed in a box shape in which one surface (one surface orthogonal to the Z axis) is opened as opening 33. Lid body 4 is joined to case 3 to close opening 33, thereby constituting an outer shell of active ingredient generation system 1 together with case 3. Internal component 2 is housed in an inner space of case 3 surrounded by case 3 and lid body 4. As a result, internal component 2 is covered with lid body 4 so as not to be exposed from opening 33 in a state of being assembled in case 3 from opening 33.

In the present exemplary embodiment, case 3 includes bottom plate 35, peripheral wall 36, and flange portion 37. Peripheral wall 36 protrudes from the outer peripheral edge of bottom plate 35 toward the negative direction of the Z axis. A surface of bottom plate 35 facing the negative direction of the Z axis, that is, a surface surrounded by peripheral wall 36 becomes bottom surface 310 of case 3 (see FIG. 6A). Flange portion 37 protrudes outward from the distal end of peripheral wall 36. Case 3 is joined to lid body 4 at flange portion 37.

In the present exemplary embodiment, case 3 includes metal body 30. Metal body 30 surrounds at least discharger 21 of internal components 2. Metal body 30 has seamless portion 301 at a corner between two adjacent surfaces oriented in different directions.

The "seamless portion" in the present disclosure means a portion that seamlessly connects two adjacent surfaces at a corner between the two adjacent surfaces oriented in different directions. That is, seamless portion 301 fills at least a part of the gap between two adjacent surfaces at the corner, thereby seamlessly connecting the two adjacent surfaces. Seamless portion 301 only needs to have a configuration in which the gap is reduced so as to fill at least a part of the gap between two adjacent surfaces, and includes both a configuration in which the gap is completely filled and a configuration in which only a part of the gap is filled. That is, seamless portion 301 may be configured to close at least a part of the gap so as to reduce the gap between the two adjacent surfaces at the corner of metal body 30. Therefore, in active ingredient generation system 1 according to the present exemplary embodiment, although there is seamless portion 301, there may be a slight gap or hole at a corner between two adjacent surfaces of metal body 30 directed in different directions from each other.

Here, the box-shaped case 3 is formed by throttling a metal plate (rectangular tube throttling). In case 3 formed as described above, not only the corners between bottom plate 35 and peripheral wall 36, but also the four corners of peripheral wall 36 located at the four corners in the plan view do not have joints. In other words, in the present exemplary embodiment, at least a gap between corners between two adjacent surfaces of peripheral wall 36 oriented in different directions from each other is completely filled with seamless portion 301. Therefore, peripheral wall 36 surrounding bottom surface 310 of case 3 is formed of one metal plate continuous without a seam in the circumferential direction of bottom surface 310.

According to active ingredient generation system 1 of the present exemplary embodiment, since at least discharger 21 is surrounded by metal body 30 of case 3, metal body 30 functions as a shield against electromagnetic noise generated at the time of discharge in discharger 21. Moreover, metal body 30 has a seamless structure having seamless portion 301 at a corner between two adjacent surfaces oriented in different directions. Seamless portion 301 can reduce the electromagnetic noise leaking from the gap at the corner between the two adjacent surfaces.

In the present exemplary embodiment, case 3 is formed of a conductive metal plate. Therefore, entire case 3 becomes metal body 30 made of metal. Similarly to case 3, lid body 4 is also formed of a conductive metal plate. Therefore, entire lid body 4 is made of metal. Therefore, internal component 2 is accommodated in a space surrounded by metal members (case 3 and lid body 4). Internal component 2 is fixed to case 3 in case 3. Internal component 2 is fixed to bottom surface 310 of case 3 by fixing circuit board 230 to fixing portion 61 with screw 71 and nut 72. That is, case 3 has fixing portion 61 that fixes circuit board 230 to bottom surface 310 of case 3.

Case 3 further includes support 62. Support 62 has a function of supporting circuit board 230 included in internal component 2. In the present exemplary embodiment, a pair of supports 62 is provided on a pair of inner side surfaces of peripheral wall 36 facing each other in the Y axis direction. The pair of supports 62 protrudes from portions of the pair of inner side surfaces facing each other in directions approaching each other.

Case 3 further includes restriction part 63. Restriction part 63 is located between bottom surface 310 of case 3 and circuit board 230. Restriction part 63 has a function of restricting movement of circuit board 230 in a direction approaching bottom surface 310. In the present exemplary embodiment, a pair of restriction parts 63 is provided on a pair of inner side surfaces of peripheral walls 36 facing each other in the Y axis direction. The pair of restriction parts 63 protrudes from portions of the pair of inner side surfaces facing each other in directions approaching each other.

Lid body 4 is formed in a rectangular shape with the X axis direction as a longitudinal direction and the Y axis direction as a lateral direction in plan view (as viewed from the positive direction of the Z axis). Lid body 4 includes first closing piece 42 that closes a part of discharge port 31 of case 3 and second closing piece 43 that closes a part of connector port 34 of case 3. Each of first closing piece 42 and second closing piece 43 is formed of a cut-and-raised portion (cut-and-bent portion) of a metal plate constituting lid body 4. Lid body 4 has rib 44 extending in a longitudinal direction (X axis direction) of lid body 4, and is reinforced by rib 44.

Lid body 4 is larger in longitudinal dimension than case 3. In a state where lid body 4 is joined to case 3, at least both end portions of lid body 4 in the longitudinal direction protrude outward from case 3 in plan view. In other words, lid body 4 has overhanging portion 45 projecting outward from the outer peripheral edge of case 3 in plan view. In active ingredient generation system 1, overhanging portion 45 of lid body 4 is attached to an attachment object by, for example, being screwed to the attachment object (vehicle in the present exemplary embodiment).

Buffer 41 is sandwiched between lid body 4 and a part of internal component 2. That is, buffer 41 is accommodated in the inner space of case 3 surrounded by case 3 and lid body 4 together with internal component 2. In the present exemplary embodiment, buffer 41 is attached to the surface of lid body 4 facing case 3.

In the present exemplary embodiment, buffer 41 is disposed so as to be sandwiched between fan motor 22 which is a part of internal component 2 and lid body 4. That is, as described above, internal component 2 includes fan motor 22 as the air blowing unit that generates the air flow for outputting the active ingredient from discharge port 31 to the outside of case 3. Then, buffer 41 contacts at least fan motor 22.

Therefore, fan motor 22, which is a part of internal component 2, is not in direct contact with lid body 4, but buffer 41 is interposed between fan motor 22 and lid body 4. Buffer 41 has elasticity, and is made of, for example, a cushion material such as ethylene propylene diene rubber (EPDM) foam. Therefore, in a state where lid body 4 is joined to case 3, buffer 41 is compressed between lid body 4 and fan motor 22 which is a part of internal component 2, and internal component 2 is pressed against bottom surface 310 (see FIG. 6A) side of case 3 by the elastic force of buffer 41. As a result, movement of internal component 2 (particularly, fan motor 22) in a direction away from bottom surface 310 of case 3, vibration of internal component 2 (particularly, fan motor 22), and the like are suppressed. In the present exemplary embodiment, in particular, since buffer 41 comes into contact with fan motor 22 which has a movable portion and thus is likely to generate mechanical vibration, it is easy to suppress mechanical vibration generated in fan motor 22.

Air passage member 5 is accommodated in case 3. That is, air passage member 5 is accommodated in the inner space of case 3 surrounded by case 3 and lid body 4 together with internal component 2 and buffer 41. In the present exemplary embodiment, air passage member 5 is disposed between internal component 2 and lid body 4 in a state of being fixed to lid body 4. Air passage member 5 forms an air passage for allowing an air flow (wind) to pass between air supply port 32 and discharge port 31 of case 3. That is, air passage member 5 forms an air passage in case 3 by dividing the inner space of case 3 into a space for allowing an air flow to pass and other spaces.

Here, fan motor 22 and discharger 21 of internal component 2 are disposed in the middle of the air passage formed by air passage member 5. Fan motor 22 generates an air flow (wind) flowing from air supply port 32 toward discharge port 31 through the air passage. In the present exemplary embodiment, discharger 21 is disposed on the downstream side of fan motor 22 in the air passage, that is, between fan motor 22 and discharge port 31.

Therefore, the air taken into case 3 from air supply port 32 moves through the air passage formed by air passage member 5 to discharge port 31 in case 3, and is discharged from discharge port 31 to the outside of case 3. The active ingredient generated by discharger 21 is discharged from discharge port 31 to the outside of case 3 along the air flow generated by fan motor 22. In other words, fan motor 22 as an air blowing unit is disposed between air supply port 32 and discharger 21 in the air passage, and the active ingredient generated in discharger 21 is pushed out by fan motor 22 and discharged to the outside of case 3.

The air path formed by air passage member 5 includes an air supply passage on the upstream side of fan motor 22 and an air discharge passage on the downstream side of fan motor 22. That is, the air supply passage connects fan motor 22 and air supply port 32, and the air discharge passage connects fan motor 22 and discharge port 31. Air passage member 5 controls the flow of air (including the active ingredient) so that the active ingredient is relatively efficiently released to the outside of case 3. Here, air passage member 5 integrally includes an upstream block and a downstream block. The upstream block forms an air supply passage on the upstream side as viewed from fan motor 22. The downstream block forms an air discharge passage on the downstream side as viewed from fan motor 22. In this manner, air passage member 5 includes the air supply passage and the air discharge passage in case 3, and forms an air passage for allowing an air flow to pass.

Figure 5:
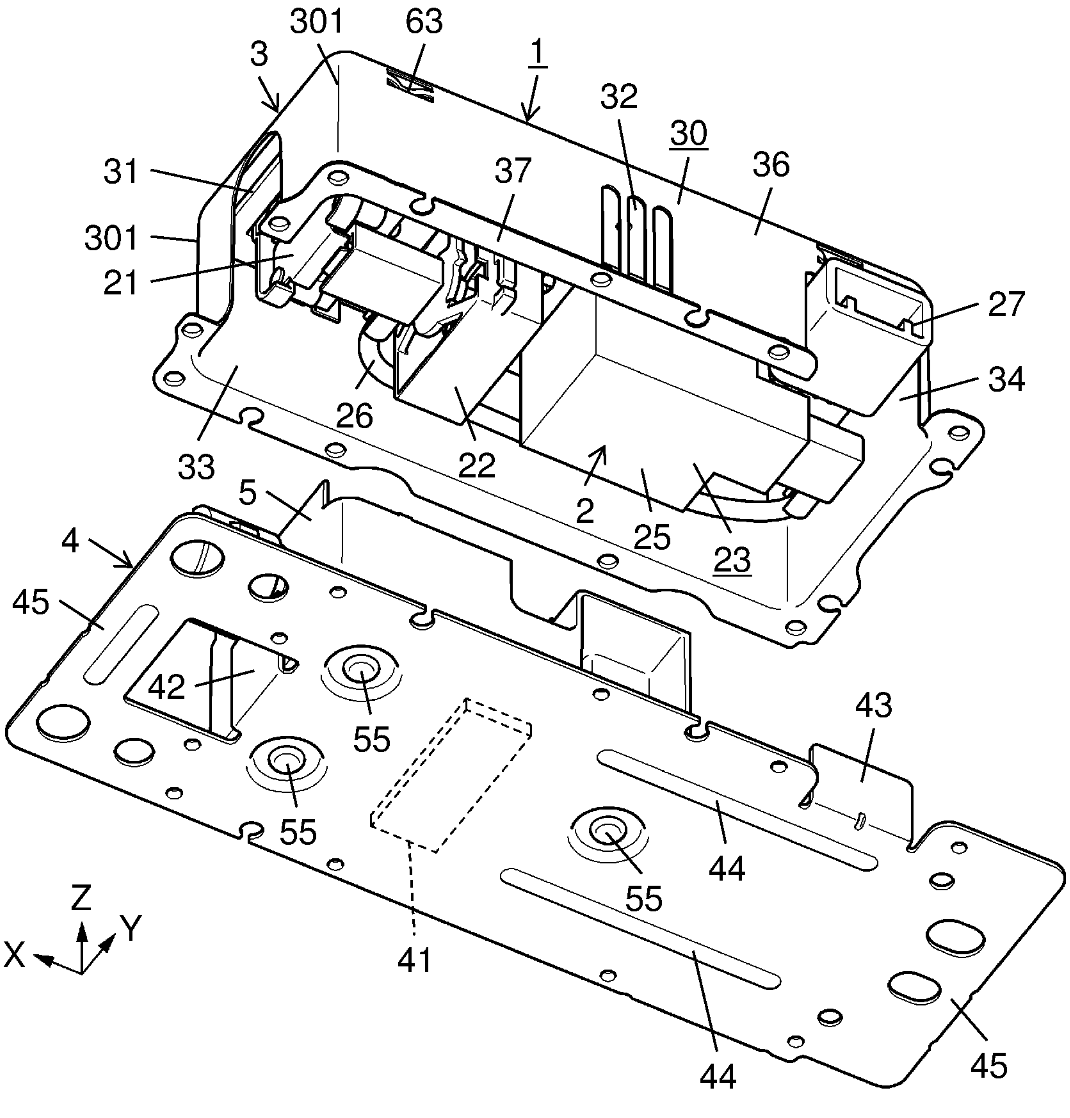
FIG. 5 is an exploded perspective view of the active ingredient generation system.

In the present exemplary embodiment, air passage member 5 is made of synthetic resin. That is, air passage member 5 made of a resin molded article is fixed to lid body 4 made of a metal plate. As illustrated in FIG. 5, air passage member 5 is fixed to lid body 4 by means such as thermal caulking. That is, air passage member 5 has a plurality of (three in this case) caulking portions 55. Air passage member 5 is fixed to the one surface side (the positive side of the Z axis) of lid body 4 by caulking the plurality of caulking portions 55 to a plurality of (here, three) caulking holes formed in lid body 4. Further, air passage member 5 is formed integrally with nozzle 51 for discharging the air containing the active ingredient. That is, active ingredient generation system 1 according to the present exemplary embodiment includes nozzle 51, and nozzle 51 is integrated with air passage member 5. Nozzle 51 is disposed in discharge port 31 of case 3, and the air discharged from discharge port 31 to the outside of case 3 is discharged to the outside of case 3 through nozzle 51.

(2.3) Configuration of Internal Components

Figure 6A:
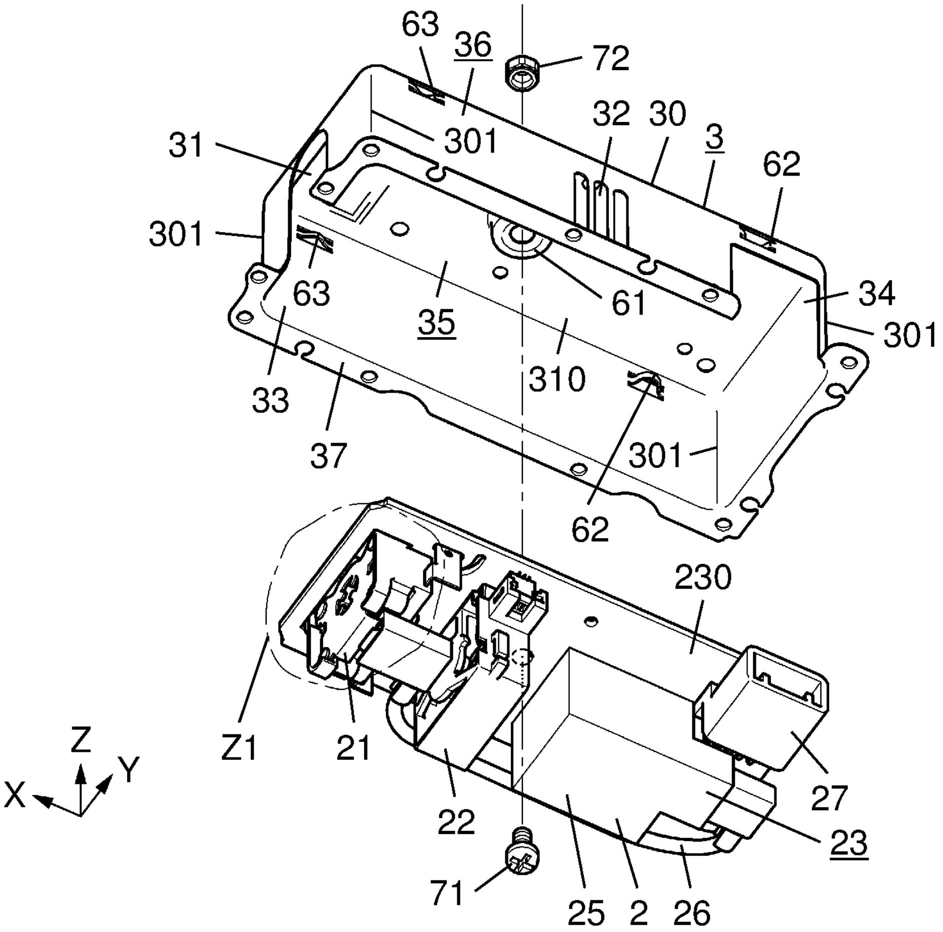
FIG. 6A is an exploded perspective view illustrating a case and internal components of the active ingredient generation system.

Next, the configuration of internal component 2 will be described with reference to FIGS. 5, 6A, and 6B.

Figure 6B:
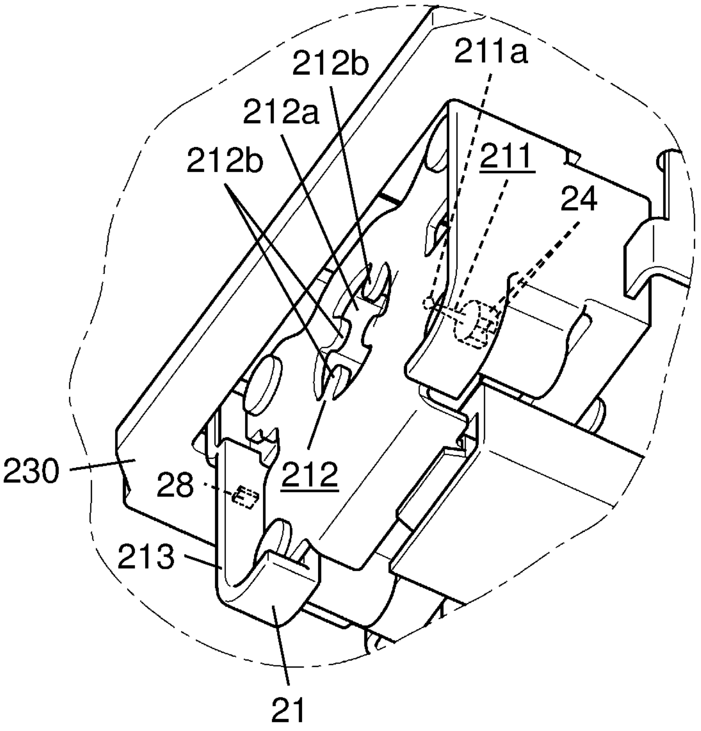
FIG. 6B is a schematic perspective view of a region Z1 in FIG. 6A.

In addition to discharger 21 and fan motor 22, internal component 2 further includes fan control system 10, drive circuit 23, liquid supply unit 24 (see FIG. 6B), and second temperature sensor 28 (see FIG. 6B).

As illustrated in FIG. 6B, discharger 21 includes discharge electrode 211 and counter electrode 212. Discharger 21 further includes holding block 213 made of a synthetic resin having electrical insulation properties. As described above, discharger 21 generates discharge by applying a voltage between discharge electrode 211 and counter electrode 212.

Discharge electrode 211 is a columnar electrode extending along the X axis. Discharge electrode 211 is a needle electrode in which at least distal end portion 211*a* in the longitudinal direction (X axis direction) is formed in a tapered shape. The "tapered shape" herein is not limited to a shape having a highly sharpened distal end, and includes a shape having a rounded distal end. In particular, in the example of FIG. 6B, distal end portion 211*a* of discharge electrode 211 has a spherical shape, and a half of distal end portion 211*a* on discharge electrode 211 side (that is, a hemispherical portion on the positive side of the X axis) has a rounded tapered shape. As an example, discharge electrode 211 is made of a conductive metal material such as a titanium alloy (Ti alloy).

Counter electrode 212 is disposed so as to face distal end portion 211*a* of discharge electrode 211. In the present exemplary embodiment, counter electrode 212 is made of a metal plate, and is disposed at a position away from distal end portion 211*a* of discharge electrode 211 in the positive direction of the X axis. Through hole 212*a* penetrating the metal plate in the thickness direction (X axis direction) is formed in a part of counter electrode 212. Counter electrode 212 includes a plurality of (for example, four) projecting electrode portions 212*b* projecting from the peripheral edge of through hole 212*a* toward the center of through hole 212*a*. As an example, counter electrode 212 is made of a conductive metal material such as a titanium alloy (Ti alloy).

Holding block 213 holds discharge electrode 211 and counter electrode 212. As an example, holding block 213 is coupled to counter electrode 212 by thermal caulking or the like. As a result, counter electrode 212 is held by holding block 213. In a state where discharge electrode 211 and counter electrode 212 are held by holding block 213, the center of through hole 212*a* is located on a center axis of discharge electrode 211 as viewed from one side of the center axis of discharge electrode 211.

Fan motor 22 functions as an air blowing unit that generates an air flow for releasing the active ingredient. As described above, fan motor 22 includes rotor 101 and stator 102. Fan motor 22 operates to rotate rotor 101 in response to an electric signal (DC voltage in the present exemplary embodiment) from fan control system 10. When rotor 101 of fan motor 22 rotates, an air flow (wind) is generated along with the rotation of blades 104 included in rotor 101. In the present exemplary embodiment, as an example, fan motor 22 is an axial fan that generates an air flow along the axis of rotation of rotor 101. Fan motor 22 is disposed such that the axis of rotation of rotor 101 is parallel to the X axis. Therefore, fan motor 22 generates an air flow flowing from air supply port 32 toward discharge port 31 along the X axis, that is, in the positive direction of the X axis. Fan motor 22 will be described in detail in the section of "(2.5) Configuration of fan motor".

Fan control system 10 controls fan motor 22. In the present exemplary embodiment, as an example, fan control system 10 mainly includes a microcontroller including one or more processors and one or more memories. That is, the processor of the microcontroller executes the program recorded in the memory of the microcontroller, thereby implementing the function of fan control system 10. The programs may be recorded in advance in the memory, may be provided through a telecommunication line such as the Internet, or may be provided by being recorded in a non-transitory recording medium such as a memory card. Further, in the present exemplary embodiment, since fan control system 10 controls fan motor 22 by applying a DC voltage as an electric signal to fan motor 22, the fan control system includes voltage conversion circuit 13 (see FIG. 1) for converting the DC voltage. Fan control system 10 will be described in detail in the section of "(2.6) Configuration of fan control system".

Drive circuit 23 includes circuit board 230 and various mounted components such as transformer 25. The mounted components such as transformer 25 are mounted on circuit board 230. Further, in the present exemplary embodiment, not only the mounted components (such as transformer 25) constituting drive circuit 23 but also fan control system 10, discharger 21, fan motor 22, and liquid supply unit 24 are directly or indirectly mounted on circuit board 230. Connector 27 for electrically connecting drive circuit 23 to an external circuit is also mounted on circuit board 230. The mounting here means a mechanical and electrical connection to circuit board 230. That is, the mounted component (such as transformer 25), fan control system 10, discharger 21, fan motor 22, liquid supply unit 24, and connector 27 are mechanically and electrically connected to circuit board 230 by means such as soldering or connector connection. In the present exemplary embodiment, the mechanical connection of fan motor 22 to circuit board 230 is realized by snap-fitting in which a claw (hook) provided on fan motor 22 is hooked on circuit board 230.

Drive circuit 23 is a circuit that drives discharger 21. That is, drive circuit 23 is a circuit that generates discharge in discharger 21 by applying an applied voltage between discharge electrode 211 and counter electrode 212 constituting discharger 21. The "applied voltage" in the present disclosure means a voltage applied between discharge electrode 211 and counter electrode 212 by drive circuit 23 in order to generate discharge.

Drive circuit 23 receives power supply from the power supply and generates a voltage (applied voltage) to be applied to discharger 21. The "power supply" mentioned herein is a power supply that supplies power for operation to drive circuit 23 and the like, and is, for example, a power supply circuit that generates a DC voltage of about several V to tens of several V. For example, drive circuit 23 boosts the input voltage from the power supply by transformer 25, and outputs the boosted voltage as the applied voltage. That is, in drive circuit 23, a high voltage (applied voltage) for causing discharge in discharger 21 is generated on the secondary side of transformer 25.

Here, drive circuit 23 includes a reference potential point. The reference potential point is electrically connected to metal body 30. In the present exemplary embodiment, the reference potential point is the ground in drive circuit 23. That is, metal body 30 of case 3 is electrically connected to the ground which is the reference potential point of drive circuit 23, whereby the frame ground is realized.

Drive circuit 23 is electrically connected to discharger 21 (discharge electrode 211 and counter electrode 212). Specifically, the secondary terminal of transformer 25 in drive circuit 23 is electrically connected to discharger 21 by harness 26. In the present exemplary embodiment, drive circuit 23 applies a high voltage between discharge electrode 211 and counter electrode 212 with discharge electrode 211 as a negative electrode (ground) and counter electrode 212 as a positive electrode. Therefore, the secondary terminal of transformer 25 is connected to counter electrode 212 of discharger 21, and the ground is connected to discharge electrode 211 as a reference potential point set on circuit board 230. As a result, drive circuit 23 applies a high voltage to discharger 21 such that discharge electrode 211 is on a low potential side and counter electrode 212 is on a high potential side. The term "high voltage" as used herein may be any voltage as long as the voltage is set so as to cause full path breakdown discharge or partial breakdown discharge to be described later in discharger 21, and is, for example, a voltage having a peak of about 6.0 kV. The full path breakdown discharge and the partial breakdown discharge will be described in detail in the section of "(2.4) Operation of active ingredient generation system".

Liquid supply unit 24 supplies liquid to discharge electrode 211. In active ingredient generation system 1, liquid is electrostatically atomized by discharge generated in discharger 21. That is, for example, in a state where the liquid supplied from liquid supply unit 24 adheres to the surface of discharge electrode 211 to hold the liquid in discharge electrode 211, an applied voltage is applied to discharger 21, so that discharge occurs in discharger 21. In this configuration, the liquid held by discharge electrode 211 is electrostatically atomized by discharge energy generated in discharger 21. In the present disclosure, the liquid held by discharge electrode 211, that is, the liquid to be electrostatically atomized is also simply referred to as "liquid".

Liquid supply unit 24 supplies a liquid for electrostatic atomization to discharge electrode 211. Liquid supply unit 24 includes, for example, a Peltier element, and supplies liquid by cooling discharge electrode 211 with the Peltier element to generate dew condensation water on discharge electrode 211. In liquid supply unit 24, the Peltier element is energized from drive circuit 23 to cool discharge electrode 211 thermally coupled to the Peltier element. At this time, moisture in the air is condensed and adheres to the surface of discharge electrode 211 as dew condensation water. That is, liquid supply unit 24 cools discharge electrode 211 to generate dew condensation water as a liquid on the surface of discharge electrode 211. In this configuration, since liquid supply unit 24 can supply liquid (dew condensation water) to discharge electrode 211 using moisture in the air, supply and replenishment of the liquid to active ingredient generation system 1 become unnecessary.

Second temperature sensor 28 directly or indirectly detects the ambient temperature of fan motor 22. Second temperature sensor 28 is made of, for example, a thermistor. Active ingredient generation system 1 outputs a detection result of second temperature sensor 28 to fan control system 10. As illustrated in FIG. 6B, for example, second temperature sensor 28 is mounted on circuit board 230 together with discharger 21 and the like, and directly detects the ambient temperature of fan motor 22 by detecting the temperature of circuit board 230 or the temperature of the inner space of case 3.

(2.4) Operation of Active Ingredient Generation System

In active ingredient generation system 1 having the configuration described above, drive circuit 23 operates as follows to cause discharge in discharger 21 (discharge electrode 211 and counter electrode 212).

That is, the operation mode of drive circuit 23 includes two modes of a discharge mode and a cutoff mode. The discharge mode is a mode for increasing the applied voltage with the lapse of time, developing from the corona discharge, and forming a discharge path with dielectric breakdown at least in a part between discharge electrode 211 and counter electrode 212 to generate a discharge current. The cutoff mode is a mode for cutting off the discharge current by bringing discharger 21 into an overcurrent state. The "discharge current" in the present disclosure means a relatively large current flowing through discharge path, and does not include a minute current of about several μA generated in corona discharge before discharge path is formed. The "overcurrent state" in the present disclosure refers to a state where a current of an assumed value or more flows through discharger 21 as a result of a drop of the load by a discharge.

In the present exemplary embodiment, drive circuit 23 operates to alternately repeat the discharge mode and the cutoff mode during the drive period. Here, drive circuit 23 switches between the discharge mode and the cutoff mode at the drive frequency so as to periodically vary the magnitude of the applied voltage applied to discharger 21 at the drive frequency. The "drive period" in the present disclosure is a period during which drive circuit 23 operates to cause discharger 21 to discharge electricity.

That is, drive circuit 23 does not keep the magnitude of the voltage applied to discharger 21 including discharge electrode 211 at a constant value, but periodically varies the voltage at a drive frequency within a predetermined range. Drive circuit 23 periodically varies the magnitude of the applied voltage to cause intermittent discharge. That is, the discharge path is periodically formed in accordance with a change cycle of the application voltage, and the discharge is periodically generated. Hereinafter, a cycle in which discharge (full path breakdown discharge or partial breakdown discharge) occurs is also referred to as a "discharge cycle".

By the operation as described above, the magnitude of the electric energy acting on the liquid held in discharge electrode 211 periodically varies at the drive frequency, and as a result, the liquid held in discharge electrode 211 mechanically vibrates at the drive frequency.

In short, when a voltage is applied from drive circuit 23 to discharger 21 including discharge electrode 211, a force due to an electric field acts on the liquid held by discharge electrode 211, and the liquid is deformed. In particular, in the present exemplary embodiment, since a voltage is applied between counter electrode 212 and discharge electrode 211 facing the distal end portion 211*a* of discharge electrode 211, a force in a direction pulled toward counter electrode 212 by the electric field acts on the liquid. As a result, the liquid held at distal end portion 211*a* of discharge electrode 211 receives the force of the electric field, extends toward counter electrode 212 along the center axis of discharge electrode 211 (that is, along the X axis), and forms a conical shape called a Taylor cone. When the voltage applied to discharger 21 decreases from the state of the Taylor cone, the force acting on the liquid also decreases due to the influence of the electric field, and the liquid is deformed. As a result, the liquid held at the distal end portion 211*a* of discharge electrode 211 contracts.

The magnitude of the voltage applied to discharger 21 periodically varies at the drive frequency, so that the liquid held by discharge electrode 211 expands and contracts along the center axis of discharge electrode 211 (that is, along the X axis). In particular, since the electric field concentrates on the distal end portion (apex portion) of the Taylor cone to generate discharge, dielectric breakdown occurs in a state where the distal end portion of the Taylor cone is pointed. Therefore, discharge (full path breakdown discharge or partial breakdown discharge) is intermittently generated in accordance with the drive frequency.

That is, when the liquid held by discharge electrode 211 receives the force of the electric field to form the Taylor cone, for example, the electric field tends to concentrate between the distal end portion (apex portion) of the Taylor cone and counter electrode 212. Therefore, discharge with relatively high energy occurs between the liquid and counter electrode 212, and corona discharge generated in the liquid held by discharge electrode 211 can be further developed to discharge with high energy. As a result, it is possible to intermittently form a discharge path with dielectric breakdown at least at a part between discharge electrode 211 and counter electrode 212.

As a result, the liquid held by discharge electrode 211 is electrostatically atomized by discharge. As a result, in active ingredient generation system 1, a charged microparticle liquid having a nanometer size containing OH radicals is generated. That is, charged fine water particles as an active ingredient are generated in discharger 21. The generated charged microparticle liquid is discharged to the outside of case 3 through discharge port 31.

Next, full path breakdown discharge and partial breakdown discharge as discharge modes will be described.

The full path breakdown discharge is a discharge state in which the corona discharge progresses to the full path breakdown between the pair of electrodes (discharge electrode 211 and counter electrode 212). That is, in the full path breakdown discharge, a discharge path in which dielectric breakdown occurs as a whole is generated between discharge electrode 211 and counter electrode 212.

The term "dielectric breakdown" used in the present disclosure means that electrical insulation of an insulator (including a gas) that isolates conductors from each other is broken, and an insulation state cannot be maintained. The dielectric breakdown of the gas occurs, for example, because ionized molecules are accelerated by an electric field, collide with other gas molecules, and ionize, and an ion concentration rapidly increases to cause gas discharge.

On the other hand, the partial breakdown discharge is a discharge state in which a discharge path is formed by partial dielectric breakdown between the pair of electrodes (discharge electrode 211 and counter electrode 212) developed from the corona discharge. That is, in the partial breakdown discharge, a discharge path in which dielectric breakdown occurs partially is generated between discharge electrode 211 and counter electrode 212. That is, in the partial breakdown discharge, a discharge path with dielectric breakdown is formed not entirely but partially (locally) between discharge electrode 211 and counter electrode 212. As described above, in the partial breakdown discharge, the discharge path formed between discharge electrode 211 and counter electrode 212 does not lead to the full path breakdown but is a path in which the dielectric breakdown is partially generated.

However, in the present exemplary embodiment, the dielectric breakdown between the pair of electrodes (discharge electrode 211 and counter electrode 212) is not continuously generated, but the dielectric breakdown is intermittently generated, regardless of the discharge form of either the full path breakdown discharge or the partial breakdown discharge. Therefore, a discharge current generated between the pair of electrodes (discharge electrode 211 and counter electrode 212) is also intermittently generated.

That is, in a case where the power supply (drive circuit 23) does not have a current capacity necessary for maintaining the discharge path, the voltage applied between the pair of electrodes decreases as soon as the corona discharge progresses to dielectric breakdown, and the discharge path is interrupted and the discharge stops. The "current capacity" referred to herein is a capacity of a current that can be released in a unit time. By repeating such generation and stop of the discharge, a discharge current intermittently flows. As described above, the discharge mode in active ingredient generation system 1 according to the present exemplary embodiment is different from glow discharge and arc discharge in which dielectric breakdown is continuously generated (that is, a discharge current is continuously generated) in that a state of high discharge energy and a state of low discharge energy are repeated.

In the full path breakdown discharge or the partial breakdown discharge, active ingredients such as radicals are generated with larger energy than corona discharge, and a large amount of active ingredients about 2 to 10 times larger than corona discharge is generated. The active ingredient thus produced is not limited to sterile filtration, odor removal, moisture keeping, freshness keeping, and virus inactivation, and is a group that exhibits useful effects in various situations.

In addition, in the partial breakdown discharge, the disappearance of the active ingredient due to excessive energy can be suppressed as compared with the full path breakdown discharge, and the generation efficiency of the active ingredient can be improved as compared with the full path breakdown discharge. That is, in the full path breakdown discharge, since the energy related to the discharge is too high, a part of the generated active ingredient may disappear, leading to a decrease in the generation efficiency of the active ingredient. On the other hand, in the partial breakdown discharge, since the energy related to the discharge is suppressed to be small as compared with the full path breakdown discharge, it is possible to reduce the amount of the active ingredient lost due to exposure to excessive energy and improve the generation efficiency of the active ingredient.

Further, in the partial breakdown discharge, concentration of the electric field is loosened as compared with the full path breakdown discharge. That is, in the full path breakdown discharge, a large discharge current instantaneously flows between discharge electrode 211 and counter electrode 212 through the discharge path in which the full path is broken, and the electrical resistance at that time is very small. On the other hand, in the partial breakdown discharge, the concentration of the electric field is loosened, so that the maximum value of the current instantaneously flowing between discharge electrode 211 and counter electrode 212 is suppressed to be smaller than that in the full path breakdown discharge at the time of forming the discharge path in which the dielectric breakdown is partially generated. As a result, in the partial breakdown discharge, generation of nitride oxide (NOx) is suppressed and generation of electromagnetic noise is also suppressed as compared with the full path breakdown discharge.

(2.5) Configuration of Fan Motor

Next, a configuration of fan motor 22 according to the present exemplary embodiment will be described with reference to FIGS. 1 to 2C.

As illustrated in FIG. 1, fan motor 22 includes driver 227 and coil 222. Driver 227 receives an electric signal from fan control system 10 to drive coil 222. Coil 222 is driven by driver 227 to give a rotational force to rotor 101 to rotate rotor 101.

In the present exemplary embodiment, fan motor 22 mainly includes a direct current (DC) brushless motor that operates when a DC voltage is applied. Fan motor 22 mainly including the DC brushless motor drives coil 222 included in stator 102 according to the magnitude of the input (applied) DC voltage, thereby rotating rotor 101 including permanent magnet 226 (see FIG. 2A). That is, fan motor 22 applies a rotational force to permanent magnet 226 of rotor 101 by changing the magnetic field generated by coil 222 of stator 102, and rotates rotor 101. Therefore, in the present exemplary embodiment, driver 227 includes, for example, a semiconductor element and the like, and changes the magnetic field generated in coil 222 by controlling the current flowing through coil 222 according to the DC voltage as the electric signal input from fan control system 10.

In the present exemplary embodiment, it is assumed that fan motor 22 operates at a rotation speed and with a torque proportional to the magnitude of the input (applied) DC voltage. That is, when the DC voltage as an electric signal applied from fan control system 10 to fan motor 22 increases, driver 227 drives coil 222 so as to increase the rotation speed of fan motor 22 in proportion to the increase in the DC voltage. Conversely, when the DC voltage as an electric signal applied from fan control system 10 to fan motor 22 decreases, driver 227 drives coil 222 to decrease the rotation speed of fan motor 22 in proportion to the decrease in the DC voltage.

FIG. 2A is a schematic sectional view schematically illustrating a configuration of fan motor 22. That is, fan motor 22 includes rotor 101, stator 102, and impregnated bearing 103. In the present exemplary embodiment, fan motor 22 further includes driver 227. Here, stator 102 includes coil 222, housing 223, and cylindrical portion 224. Rotor 101 includes blades 104, shaft 225, and permanent magnet 226.

Housing 223 is formed in a box shape and constitutes an outer shell of fan motor 22. In the present exemplary embodiment, as an example, housing 223 is made of synthetic resin and is integrally molded with cylindrical portion 224. Cylindrical portion 224 protrudes from a central portion of the bottom surface of housing 223. Rotor 101 including blades 104, impregnated bearing 103, driver 227, coil 222, and the like are accommodated in housing 223.

Cylindrical portion 224 holds impregnated bearing 103 inside housing 223. Cylindrical portion 224 holds impregnated bearing 103 by accommodating impregnated bearing 103 therein. In addition to impregnated bearing 103, a nonwoven fabric impregnated with lubricant 105 is accommodated inside cylindrical portion 224. That is, lubricant 105 is impregnated not only in impregnated bearing 103 but also in the nonwoven fabric. Therefore, impregnated bearing 103 is impregnated with lubricant 105 impregnated in the nonwoven fabric, so that lubricant 105 of impregnated bearing 103 is hardly depleted even if lubricant 105 is not replenished into cylindrical portion 224. However, the nonwoven fabric is not essential for fan motor 22, and for example, the nonwoven fabric may be omitted, and there may be a space for storing lubricant 105 around impregnated bearing 103.

Coil 222 is formed in an annular shape and is disposed around cylindrical portion 224. Further, permanent magnet 226 of rotor 101 is disposed around coil 222. That is, coil 222 is disposed at a position surrounded by permanent magnet 226 of rotor 101. Since coil 222 is a part of stator 102, it is fixed so as not to move relative to housing 223.

Impregnated bearing 103 is a cylindrical component, and is held by cylindrical portion 224 in a state of being inserted into cylindrical portion 224. Shaft 225 of rotor 101 is inserted into impregnated bearing 103. Thus, impregnated bearing 103 rotatably supports shaft 225 of rotor 101. In other words, stator 102 rotatably supports rotor 101 via impregnated bearing 103 at cylindrical portion 224 of stator 102. Here, rotor 101 rotates about the central axis of shaft 225 as an axis of rotation. That is, the axis of rotation of rotor 101 coincides with the central axis of shaft 225.

Blade 104 is mechanically coupled to a distal end of shaft 225. As a result, rotor 101 rotates about the axis of rotation of rotor 101 (the central axis of shaft 225), whereby blades 104 rotate. In the present exemplary embodiment, since fan motor 22 is an axial fan, an air flow along the axis of rotation of rotor 101 (the central axis of shaft 225) is generated by the rotation of blades 104.

Permanent magnet 226, together with blades 104, is mechanically coupled to the distal end of shaft 225. Permanent magnet 226 is disposed at a position surrounded by blades 104. Permanent magnet 226 is disposed around coil 222 so as to face coil 222 with a certain gap interposed therebetween. Therefore, rotor 101 receives the rotational force according to the change in the magnetic field generated by coil 222 in permanent magnet 226, and rotates about the axis of rotation of rotor 101 (the central axis of shaft 225).

In the present exemplary embodiment, fan motor 22 further includes first temperature sensor 221 (see FIG. 1). First temperature sensor 221 directly or indirectly detects the temperature of impregnated bearing 103. First temperature sensor 221 is made of, for example, a thermistor. Fan motor 22 outputs a detection result of first temperature sensor 221 to fan control system 10. First temperature sensor 221 indirectly detects the temperature of impregnated bearing 103, for example, by detecting the temperature of shaft 225 or the temperature of the inner space of cylindrical portion 224.

Figure 2B:
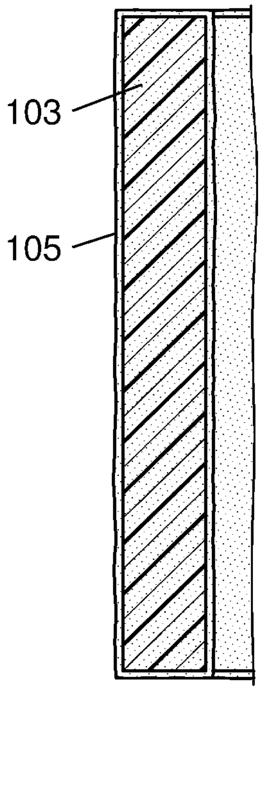
FIG. 2B is a schematic sectional view of the impregnated bearing of the fan motor.
Figure 2C:
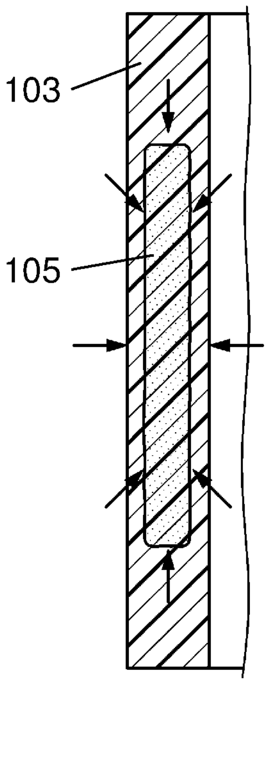
FIG. 2C is a schematic sectional view of the impregnated bearing of the fan motor.

As illustrated in FIGS. 2B and 2C, impregnated bearing 103 is impregnated with lubricant 105. FIGS. 2B and 2C are schematic sectional views of main parts schematically illustrating the vicinity of the cross section of impregnated bearing 103. In the present exemplary embodiment, as an example, impregnated bearing 103 is molded by sintering metal powder, and can be impregnated with lubricant 105. That is, impregnated bearing 103 is used in a state in which a porous structure having a large number of gaps (voids) is realized by a sintered body of metal powder and the large number of gaps are impregnated with lubricant 105. Basically, impregnated bearing 103 sucks lubricant 105 into a large number of gaps by capillary action, and maintains a state in which lubricant 105 is held in the large number of gaps. In the present exemplary embodiment, as an example, lubricant 105 is made of a lubricating oil (oil) such as a synthetic oil or a mineral oil. Therefore, impregnated bearing 103 is impregnated with (contains) oil as lubricant 105, and is also referred to as an "oil-containing bearing".

According to impregnated bearing 103 having such a configuration, when rotor 101 rotates, shaft 225 rotates to generate a pump action, and lubricant 105 impregnated in impregnated bearing 103 seeps out to the surface of impregnated bearing 103. Further, since lubricant 105 usually has a positive thermal expansion coefficient, even when lubricant 105 expands due to frictional heat generated by friction between shaft 225 and impregnated bearing 103, lubricant 105 impregnated in impregnated bearing 103 seeps out to the surface of impregnated bearing 103. As described above, lubricant 105 impregnated in impregnated bearing 103 seeps out to the surface of impregnated bearing 103, so that a liquid membrane (oil membrane) of lubricant 105 (oil) is formed on the surface (including the inner peripheral surface) of impregnated bearing 103 as illustrated in FIG. 2B. As a result, lubricant 105 realizes a lubricating action between impregnated bearing 103 and rotor 101.

On the other hand, when rotor 101 stops, the pump action is lost and frictional heat is also lost, so that the temperature of lubricant 105 decreases and lubricant 105 contracts. At this time, impregnated bearing 103 sucks lubricant 105 into a large number of gaps by capillary action, and returns to a state in which lubricant 105 is held in the large number of gaps. By repeating such an operation, impregnated bearing 103 can maintain the lubricating action even without replenishment of lubricant 105.

However, in fan motor 22 using impregnated bearing 103, when the impregnation amount of lubricant 105 in impregnated bearing 103 falls below an appropriate amount, for example, lubricant 105 may excessively shrink under a special environment such as a low temperature environment. FIG. 2C schematically illustrates a state of impregnated bearing 103 when lubricant 105 excessively shrink. In the example of FIG. 2C, when the cross section of impregnated bearing 103 is divided into the outer peripheral portion and the inside surrounded by the outer peripheral portion due to excessive contraction of lubricant 105, lubricant 105 exists only in the inside. In other words, lubricant 105 does not exist in the vicinity of the surface (including the inner peripheral surface) of impregnated bearing 103, and contracted lubricant 105 exists in a portion (inside) away from the surface of impregnated bearing 103. In such a state, lubricant 105 impregnated in impregnated bearing 103 is less likely to seep out to the surface of impregnated bearing 103, and a good liquid membrane (oil membrane) due to lubricant 105 (oil) is less likely to be formed on the surface (including the inner peripheral surface) of impregnated bearing 103.

Therefore, in fan motor 22 using impregnated bearing 103, when lubricant 105 is driven in an excessively contracted state as described above, a good liquid membrane due to lubricant 105 is not formed, and friction may occur between impregnated bearing 103 and shaft 225. That is, when "sliding" occurs in which shaft 225 moves while rubbing against impregnated bearing 103 in a state where impregnated bearing 103 and shaft 225 are in direct contact with each other without lubricant 105 interposed therebetween, there is a possibility that abnormal noise such as sliding noise occurs, vibration occurs, or loss occurs.

(2.6) Configuration of Fan Control System

Next, a configuration of fan control system 10 according to the present exemplary embodiment will be described with reference to FIGS. 1 and 3.

Fan control system 10 controls fan motor 22 by giving an electric signal to fan motor 22. As illustrated in FIG. 1, fan control system 10 includes controller 11, switch 12, and voltage conversion circuit 13. In the present exemplary embodiment, as described above, fan control system 10 mainly includes a microcontroller, and at least the functions of controller 11 and switch 12 are realized by the microcontroller.

Controller 11 selects a control mode from a plurality of control modes including a first mode and a second mode. The first mode is a control mode in which an electric signal is given to fan motor 22 so that fan motor 22 operates at the first rotation speed. The second mode is a control mode in which an electric signal is given to fan motor 22 so that fan motor 22 operates at a second rotation speed lower than the first rotation speed. Controller 11 has a function (idling function) of selecting the second mode in a period after the start of fan motor 22 and before the selection of the first mode.

That is, controller 11 has a function of selecting a control mode from among a plurality of control modes, and operates to give an electric signal corresponding to the control mode being selected to fan motor 22. For example, while controller 11 selects the first mode, controller 11 gives an electric signal to fan motor 22 so that fan motor 22 operates at the first rotation speed. On the other hand, while controller 11 selects the second mode, controller 11 gives an electric signal to fan motor 22 so that fan motor 22 operates at the second rotation speed. Then, by selecting the second mode in a period after the start of fan motor 22 and before the selection of the first mode by the idling function, controller 11 controls fan motor 22 so as to suppress the rotation speed immediately after the start of fan motor 22 to be low (to the second rotation speed).

In the present exemplary embodiment, fan control system 10 applies a DC voltage as an electric signal to fan motor 22, and controls fan motor 22 by changing the magnitude of the DC voltage. That is, the electric signal used to control fan motor 22 is a DC voltage applied to fan motor 22. Therefore, the magnitude of the voltage is different between the DC voltage applied as an electric signal to fan motor 22 by fan control system 10 in the first mode and the DC voltage applied as an electric signal to fan motor 22 by fan control system 10 in the second mode.

However, fan control system 10 controls fan motor 22 by an electric signal given to fan motor 22, and does not directly determine the rotation speed of fan motor 22. Even if the same electric signal (DC voltage) is given to fan motor 22, it takes time to reach a desired rotation speed. Further, the rotation speed may vary depending on, for example, an individual difference of fan motor 22. Therefore, fan control system 10 merely gives a determined electric signal to fan motor 22 so that fan motor 22 ideally operates at a desired rotation speed in each control mode. In other words, controller 11 switches the electric signal to be given to fan motor 22 depending on the control mode so as to give the electric signal determined for each control mode to fan motor 22.

In the present exemplary embodiment, basically, since fan motor 22 operates at the rotation speed and with the torque proportional to the magnitude of the DC voltage applied to fan motor 22, the DC voltage applied to fan motor 22 can be regarded as a value corresponding to the rotation speed of fan motor 22. Therefore, the DC voltage (first voltage V1) applied to fan motor 22 by fan control system 10 in the first mode is higher than the DC voltage (second voltage V2) applied to fan motor 22 by fan control system 10 in the second mode (V1>V2).

In short, the first mode is a control mode in which an electric signal that causes fan motor 22 to operate at the first rotation speed is given to fan motor 22, and the rotation speed of fan motor 22 in the first mode is not necessarily the first rotation speed. Therefore, in the first mode, fan control system 10 ideally gives, to fan motor 22, an electric signal set so that fan motor 22 operates at the first rotation speed, and the electric signal (DC voltage) at this time is defined as "first voltage V1".

Similarly, the second mode is a control mode in which an electric signal that causes fan motor 22 to operate at the second rotation speed is given to fan motor 22, and the rotation speed of fan motor 22 in the second mode is not necessarily the second rotation speed. Therefore, in the second mode, fan control system 10 ideally gives, to fan motor 22, an electric signal set so that fan motor 22 operates at the second rotation speed, and the electric signal (DC voltage) at this time is defined as "second voltage V2".

In the present exemplary embodiment, first voltage V1 is a rated voltage of fan motor 22. Therefore, fan motor 22 operates at the rated rotation speed when first voltage V1 is applied. As an example, first voltage V1 is determined in a range from 6.0 [V] to 10.0 [V] inclusive, and second voltage V2 is determined in a range from 3.0 [V] to 5.0 [V] inclusive. The rotation speed of fan motor 22 when first voltage V1 is applied is assumed to be, for example, 7000 [rpm] or more and 10,000 [rpm] or less. On the other hand, it is assumed that the rotation speed of fan motor 22 when second voltage V2 is applied is, for example, 3500 [rpm] or more and 5000 [rpm] or less.

In addition, since controller 11 selects the second mode in a period after the start of fan motor 22 and before the selection of the first mode by the idling function, switching from the second mode to the first mode is performed at a certain switching timing. That is, according to the idling function of controller 11, controller 11 first selects the second mode as the control mode after the start of fan motor 22, and then switches the control mode to be selected from the second mode to the first mode at a certain switching timing. Here, the switching timing from the second mode to the first mode is determined by satisfying a determination condition described below. That is, controller 11 determines the switching timing by satisfying the determination condition for starting the first mode. Here, the timing at which the determination condition is satisfied is the switching timing.

In the present exemplary embodiment, the determination condition includes a time condition. The time condition is a condition determined with respect to the elapsed time after the start of fan motor 22. As an example, a predetermined idling time (for example, about several 10 seconds to several minutes) elapses from the start time point of the second mode is defined as the time condition. In this case, after selecting the second mode and starting fan motor 22, controller 11 determines that the time condition among the determination conditions is satisfied at a point in time when the idling time has elapsed, and switches the control mode from the second mode to the first mode. In short, in the present exemplary embodiment, the determination condition for controller 11 to start the first mode in the idling function includes a time condition related to the elapsed time after the start of fan motor 22.

In the present exemplary embodiment, the determination condition includes a temperature condition. The temperature condition is a condition determined with respect to the temperature of impregnated bearing 103. As an example, it is determined as the temperature condition that the temperature of impregnated bearing 103 is equal to or higher than a predetermined idling temperature. In this case, after selecting the second mode and starting fan motor 22, when the temperature of impregnated bearing 103 rises to the idling temperature, controller 11 determines that the temperature condition among the determination conditions is satisfied, and switches the control mode from the second mode to the first mode. In short, in the present exemplary embodiment, the determination condition for controller 11 to start the first mode in the idling function includes a temperature condition related to the temperature of impregnated bearing 103.

The temperature of impregnated bearing 103 is detected by first temperature sensor 221 of fan motor 22. Therefore, controller 11 receives the detection result of first temperature sensor 221 of fan motor 22 and determines the temperature condition on the basis of the detection result. That is, controller 11 determines that the temperature condition is satisfied when the temperature detected by first temperature sensor 221 is equal to or higher than the idling temperature. The elapsed time after the start of fan motor 22 is measured by, for example, a timer or the like included in fan control system 10.

In the present exemplary embodiment, as an example, controller 11 sets the logical sum of the time condition and the temperature condition as the determination condition. That is, controller 11 determines that the determination condition is satisfied when one of the time condition and the temperature condition is satisfied.

Figure 3:
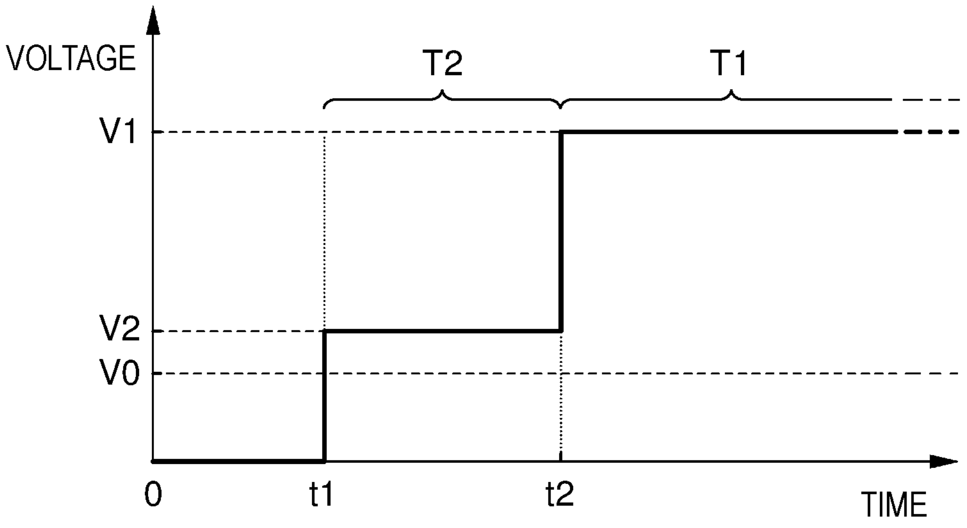
FIG. 3 is a graph illustrating an electric signal given from the fan control system to the fan motor.
Figure 4A:
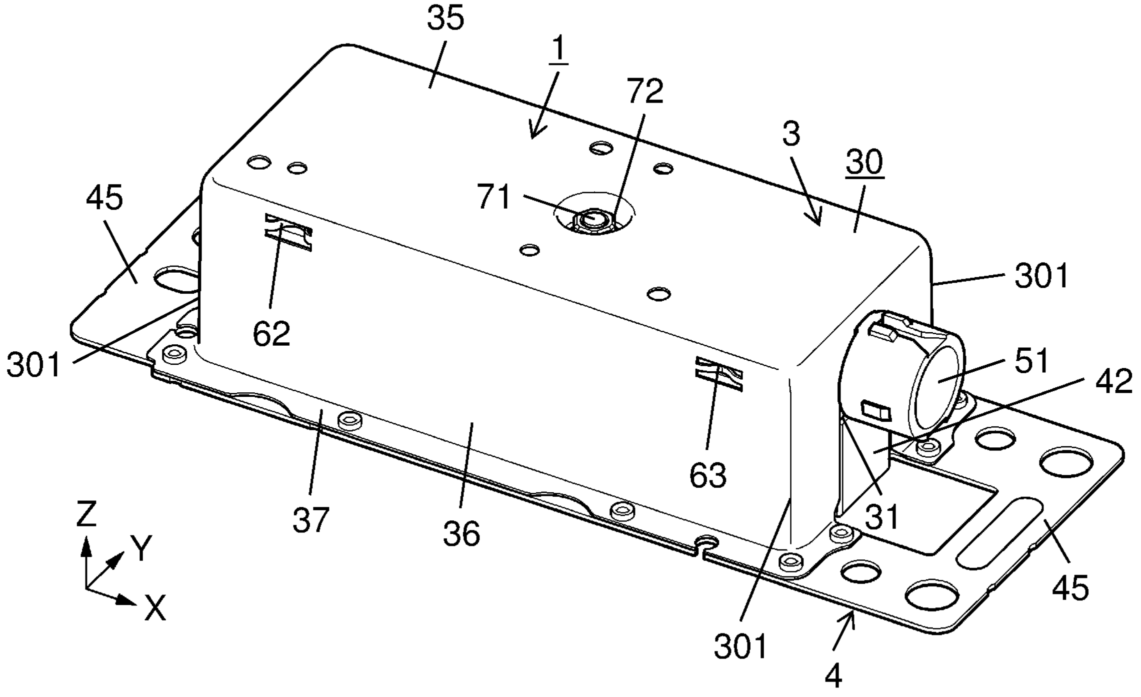
FIG. 4A is a perspective view of the active ingredient generation system.
Figure 4B:
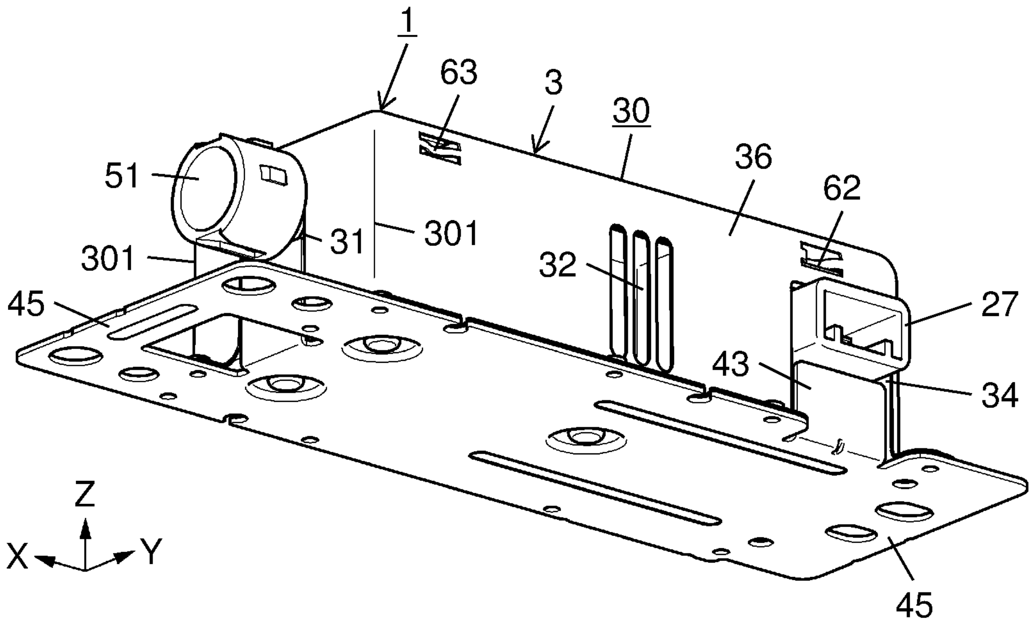
FIG. 4B is a perspective view of the active ingredient generation system as viewed from another direction.

FIG. 3 is a graph illustrating an electric signal (DC voltage) given from fan control system 10 to fan motor 22 when fan motor 22 is started. In FIG. 3, the horizontal axis represents time, and the vertical axis represents voltage. That is, the DC voltage applied to fan motor 22 changes as illustrated in FIG. 3 by the idling function of controller 11.

In short, controller 11 selects the second mode in a period after the start of fan motor 22 and before the selection of the first mode by the idling function. In the present exemplary embodiment, controller 11 selects the second mode at time point t1 when energization of fan motor 22 is started and fan motor 22 is started. Thereafter, controller 11 switches the control mode from the second mode to the first mode at time point t2 when the determination condition is satisfied. That is, in FIG. 3, time point tl is a start time of fan motor 22, and time point t2 is a switching timing that satisfies one of the time condition and the temperature condition. Therefore, controller 11 selects the second mode in period T2 from time point t1 to time point t2, and selects the first mode in period T1 after time point t2.

Therefore, in period T2 in which the second mode is selected, second voltage V2 is applied to fan motor 22 so that fan motor 22 operates at the second rotation speed lower than the first rotation speed. That is, in period T2 immediately after the start of fan motor 22, second voltage V2 suppressed to be lower than first voltage V1 which is the rated voltage is applied to fan motor 22, so that the rotation speed of fan motor 22 is suppressed to be lower than the rated rotation speed.

On the other hand, in period T1 in which the first mode is selected, first voltage V1 is applied to fan motor 22 so that fan motor 22 operates at the first rotation speed higher than the second rotation speed. That is, in period T1 after the determination condition is satisfied, the rotation speed of fan motor 22 is gradually increased to the rated first rotation speed by applying first voltage V1 that is the rated voltage to fan motor 22.

Here, in the present exemplary embodiment, since fan motor 22 is started in the second mode, second voltage V2 is equal to or higher than the minimum voltage (hereinafter, referred to as "minimum start voltage") V0 necessary for starting fan motor 22. Therefore, second voltage V2 applied to fan motor 22 in the second mode is set in a range lower than first voltage V1 and equal to or higher than minimum start voltage V0. That is, in the second mode, fan control system 10 according to the present exemplary embodiment operates fan motor 22 with a torque equal to or larger than the start torque that is the minimum torque necessary for starting fan motor 22. In the example of FIG. 3, second voltage V2 is set to be higher than minimum start voltage V0.

Switch 12 switches the idling function (function of selecting the second mode) of controller 11 between enabled and disabled. Switch 12 disables the idling function on the basis of at least environmental information related to the ambient temperature of fan motor 22. That is, in the present exemplary embodiment, the idling function of controller 11 is not always enabled, and can be disabled by switch 12. When the idling function is enabled, controller 11 selects the second mode in a period after the start of fan motor 22 and before the selection of the first mode. On the other hand, when the idling function is disabled, controller 11 selects the first mode from the start of fan motor 22. That is, when switch 12 disables the idling function, controller 11 selects the first mode immediately after the start of fan motor 22 without selecting the second mode.

In particular, since switch 12 disables the idling function on the basis of the environmental information regarding the ambient temperature of fan motor 22, it is possible to enable the idling function and select the second mode only when the ambient temperature of fan motor 22 satisfies a specific condition. In the present exemplary embodiment, as an example, the specific condition for enabling the idling function is that the ambient temperature of fan motor 22 is less than or equal to threshold temperature Tthl (for example, 15° C.). Therefore, when the ambient temperature of fan motor 22 is higher than threshold temperature Tth1 at the time of starting fan motor 22, switch 12 disables the idling function of controller 11 and causes controller 11 to select the first mode immediately after the start of fan motor 22.

The ambient temperature of fan motor 22 is detected by second temperature sensor 28. Therefore, switch 12 receives the detection result of second temperature sensor 28 and determines whether the idling function is enabled or disabled on the basis of the detection result. That is, when the temperature detected by second temperature sensor 28 is less than or equal to threshold temperature Tth1 at the time of starting fan motor 22, switch 12 enables the idling function of controller 11.

Voltage conversion circuit 13 converts a DC voltage as an electric signal to be applied to fan motor 22. Fan control system 10 according to the present exemplary embodiment applies first voltage V1 in the first mode and second voltage V2 in the second mode to fan motor 22. Therefore, voltage conversion circuit 13 performs voltage conversion so as to be able to output at least two-stage voltages of first voltage V1 and second voltage V2 as the DC voltage to be applied to fan motor 22.

In the present exemplary embodiment, as an example, voltage conversion circuit 13 is realized by a dropper type power supply circuit such as a series regulator. Specifically, voltage conversion circuit 13 switches the DC voltage to be applied to fan motor 22 in accordance with a control signal from controller 11. Here, voltage conversion circuit 13 applies first voltage V1 as the DC voltage to fan motor 22 when controller 11 selects the first mode, and applies second voltage V2 as the DC voltage to fan motor 22 when controller 11 selects the second mode. As described above, since second voltage V2 is lower than first voltage V1, voltage conversion circuit 13 steps down the DC voltage at least when second voltage V2 is applied.

(2.7) Operation of Fan Control System

Next, an operation of fan control system 10 according to the present exemplary embodiment will be described with reference to a flowchart of FIG. 7.

Fan control system 10 does not start its operation when fan control system 10 is not energized (S1: No), and starts its operation when fan control system 10 is energized (S1: Yes).

When the energization of fan control system 10 is started (S1: Yes), fan control system 10 first acquires the ambient temperature of fan motor 22 (S2). At this time, fan control system 10 acquires a detection result of the ambient temperature of fan motor 22 from second temperature sensor 28. Then, fan control system 10 determines whether to cause switch 12 to enable or disable the idling function of controller 11 on the basis of the environmental information regarding the ambient temperature of fan motor 22 (S3).

When the ambient temperature of fan motor 22 is less than or equal to threshold temperature Tth1 (S3: Yes), switch 12 enables the idling function of controller 11. Therefore, when the ambient temperature is less than or equal to threshold temperature Tth1 (S3: Yes), controller 11 of fan control system 10 selects the second mode (S4), and applies second voltage V2 as an electric signal (DC voltage) to fan motor 22 (S5). Then, fan control system 10 determines whether the determination condition is satisfied by controller 11 (S6), and when the determination condition is not satisfied (S6: No), the application of second voltage V2 (S5) is continued.

In the present exemplary embodiment, the determination condition includes a time condition and a temperature condition. Therefore, for example, when a predetermined idling time has elapsed from the time point (time point t1 in FIG. 3) when fan motor 22 is started by selecting the second mode, controller 11 determines that the determination condition is satisfied according to the time condition (S6: Yes). Alternatively, for example, when the temperature of impregnated bearing 103 rises to a predetermined idling temperature after a time point at which fan motor 22 is started by selecting the second mode (time point t1 in FIG. 3), controller 11 determines that the determination condition is satisfied depending on the temperature condition (S6: Yes).

When the determination condition is satisfied (S6: Yes), controller 11 of fan control system 10 selects the first mode (S7), and applies first voltage V1 to fan motor 22 as an electric signal (DC voltage) (S8). Then, when the energization of fan control system 10 is not ended (S9: No), fan control system 10 continues the application of first voltage V1 (S8).

When the energization of fan control system 10 is ended (S9: Yes), fan control system 10 ends a series of operations including the application of the DC voltage to fan motor 22.

Figure 7:
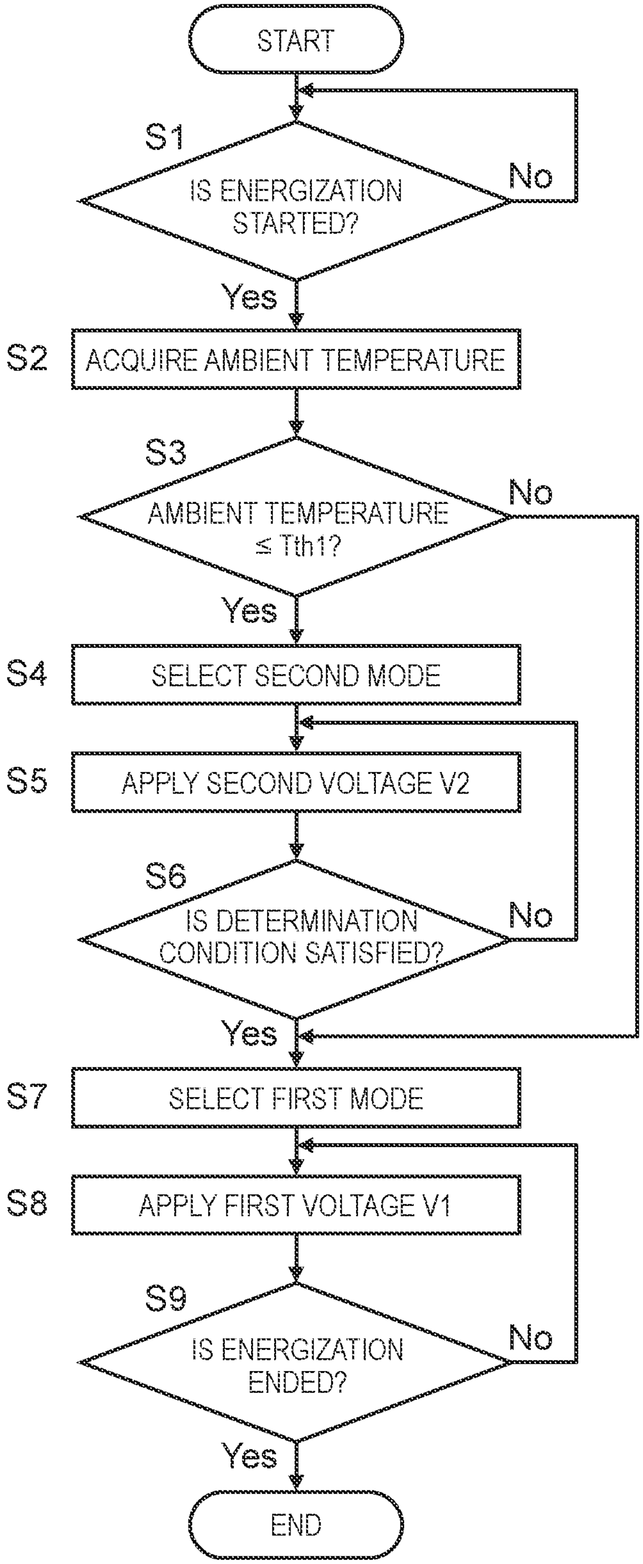
FIG. 7 is a flowchart illustrating an operation of the fan control system.

The flowchart of FIG. 7 is merely an example of the operation of fan control system 10, and the processing may be appropriately omitted or added, or the order of the processing may be appropriately changed.

The fan control method according to the present exemplary embodiment is embodied by fan control system 10. That is, the operation of fan control system 10 described above corresponds to a fan control method. Therefore, the fan control method according to the present exemplary embodiment controls fan motor 22 that includes rotor 101 including blades 104, stator 102, and impregnated bearing 103 impregnated with lubricant 105, and rotatably holds rotor 101 by impregnated bearing 103. In this fan control method, a control mode can be selected from a plurality of control modes including a first mode and a second mode. The first mode is a control mode in which an electric signal (first voltage V1 in the example of FIG. 3) is given to fan motor 22 so that fan motor 22 operates at a first rotation speed. The second mode is a control mode in which an electric signal (second voltage V2 in the example of FIG. 3) is given to fan motor 22 so that fan motor 22 operates at a second rotation speed lower than the first rotation speed. The fan control method includes an idling process (process "S4" to process "S8" in FIG. 7) of selecting the second mode in a period (period T2 in the example of FIG. 3) until the first mode is selected after the start of fan motor 22.

In the present exemplary embodiment, the fan control method can be embodied in a program in a microcontroller or the like. That is, the program according to the present exemplary embodiment is a program for embodying the fan control method in one or more processors.

(3) Action

Next, an action of fan control system 10 according to the present exemplary embodiment will be described.

First, in an atmosphere of a normal temperature (for example, 25° C.), a liquid membrane (oil membrane) by lubricant 105 (oil) is formed on the surface (including the inner peripheral surface) of impregnated bearing 103 at the time of starting fan motor 22 (see FIG. 2B). Therefore, even if fan motor 22 is controlled in the first mode to operate at the first rotation speed immediately after starting in order to for lubricant 105 to realize the lubricating action between impregnated bearing 103 and rotor 101, no particular problem occurs. In the present exemplary embodiment, when the ambient temperature of fan motor 22 is higher than threshold temperature Tth1 at the time of starting fan motor 22, switch 12 disables the idling function. Therefore, under the atmosphere of the normal temperature (for example, 25° C.), fan control system 10 performs control in the first mode so that fan motor 22 operates at the first rotation speed immediately after starting.

On the other hand, when the impregnation amount of lubricant 105 in impregnated bearing 103 is less than an appropriate amount, for example, under a special environment such as a low temperature environment, a good liquid membrane due to lubricant 105 is hardly formed on the surface of impregnated bearing 103 (see FIG. 2C). In such a situation where lubricant 105 contracts excessively, in fan control system 10 according to the present exemplary embodiment, switch 12 enables the idling function of controller 11.

According to the idling function of controller 11, the second mode is selected in a period after the start of fan motor 22 and before the selection of the first mode. Therefore, before fan motor 22 operates at the first rotation speed, fan motor 22 operates at the second rotation speed lower than the first rotation speed. Therefore, immediately after the start of fan motor 22, fan motor 22 can be operated in a state where the rotation speed of fan motor 22 is kept low. During that time, impregnated bearing 103 is warmed by frictional heat or the like generated by friction between shaft 225 and impregnated bearing 103. When impregnated bearing 103 is warmed, lubricant 105 expands to alleviate excessive shrinkage of lubricant 105, so that lubricant 105 impregnated in impregnated bearing 103 seeps out to the surface of impregnated bearing 103, and a good liquid membrane is formed by lubricant 105 on the surface of impregnated bearing 103.

Here, since the rotation speed of fan motor 22 is suppressed to be low in the second mode, even in a state where lubricant 105 is excessively contracted, a defect due to "sliding" in which shaft 225 moves while rubbing against impregnated bearing 103 hardly occurs. That is, in the second mode, even if sliding occurs, the rotation speed of fan motor 22 is suppressed to be lower than the first rotation speed, and thus, defects such as abnormal noise such as sliding noise, vibration, and loss hardly occur. As a result, according to fan control system 10 according to the present exemplary embodiment, defects such as abnormal noise caused by contraction of lubricant 105 are less likely to occur.

Further, in the present exemplary embodiment, fan motor 22 is used as an air blowing unit that generates an air flow for releasing the active ingredient in active ingredient generation system 1, but the generation amount of the active ingredient is also suppressed in the second mode. That is, fan motor 22 is not used for cooling or the like, but is used in active ingredient generation system 1 as an air blowing unit for releasing the active ingredient. However, even in active ingredient generation system 1, the active ingredient is not sufficiently generated immediately after activation. In particular, in the present exemplary embodiment, since liquid supply unit 24 of active ingredient generation system 1 supplies liquid by generating dew condensation water at discharge electrode 211, a sufficient amount of active ingredient is not generated until about several tens of seconds to several minutes elapse depending on the atmosphere or the like after the start. The period during which fan control system 10 controls fan motor 22 in the second mode at least partially overlaps with the period immediately after the activation of active ingredient generation system 1 in which the generation amount of the active ingredient is suppressed.

In short, in the present exemplary embodiment, fan motor 22 is used as an air blowing unit that generates an air flow for releasing the active ingredient in active ingredient generation system 1 including discharger 21 that generates the active ingredient. The generation amount of the active ingredient per unit time in the discharger 21 is smaller during the selection of the second mode than during the selection of the first mode in the idling function. Therefore, according to fan control system 10 of the present exemplary embodiment, it is possible to suppress the rotation speed of fan motor 22 to a low level by using a period in which the generation amount of active ingredients is small, and it is possible to make it difficult to cause defects such as abnormal noise caused by contraction of lubricant 105.

(4) Modifications

The first exemplary embodiment is merely one of various exemplary embodiments of the present disclosure. The first exemplary embodiment can be variously changed in accordance with design and the like, as long as the object of the present disclosure can be achieved. The drawings referred to in the present disclosure are all schematic drawings, and the ratio of each of the size and the thickness of each component in the drawings does not necessarily reflect the actual dimensional ratio. Hereinafter, modifications of the first exemplary embodiment will be listed. The modifications to be described below can be applied in appropriate combination.

Functions similar to those of fan control system 10 according to the first exemplary embodiment may be embodied by a fan control method, a (computer) program, a non-transitory recording medium recording the program, or the like.

The DC voltage (second voltage V2) applied to fan motor 22 in the second mode only needs to be set in a range lower than first voltage V1 and equal to or higher than minimum start voltage V0, and is not limited to a voltage higher than minimum start voltage V0. However, the DC voltage applied to fan motor 22 in the second mode is set such that the rotation speed of fan motor 22 in the second mode is suppressed to a rotation speed at which defects such as abnormal noise such as sliding noise, vibration, or loss hardly occur even in a state where lubricant 105 is excessively contracted. For example, second voltage V2 may have the same value as minimum start voltage V0.

Figure 8A:
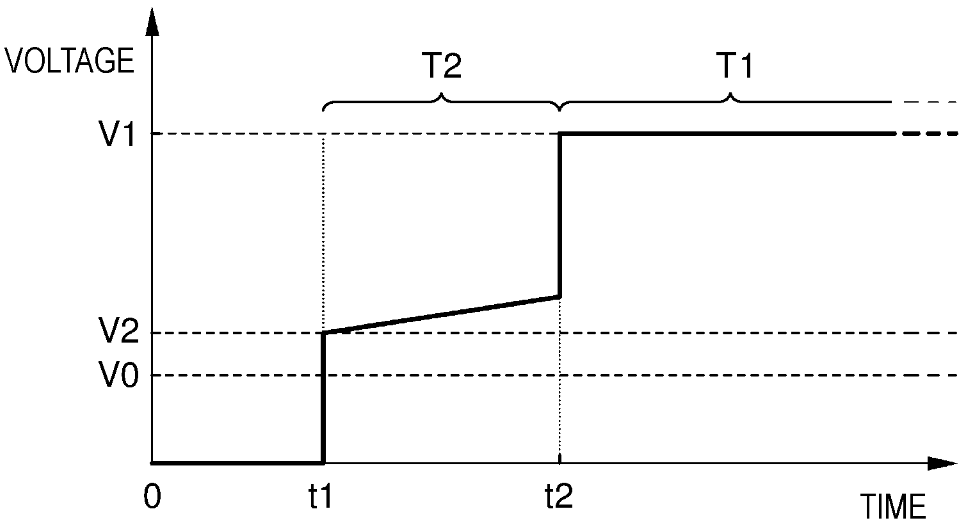
FIG. 8A is a graph illustrating an electric signal given from a fan control system to a fan motor according to a modification of the first exemplary embodiment.
Figure 8B:
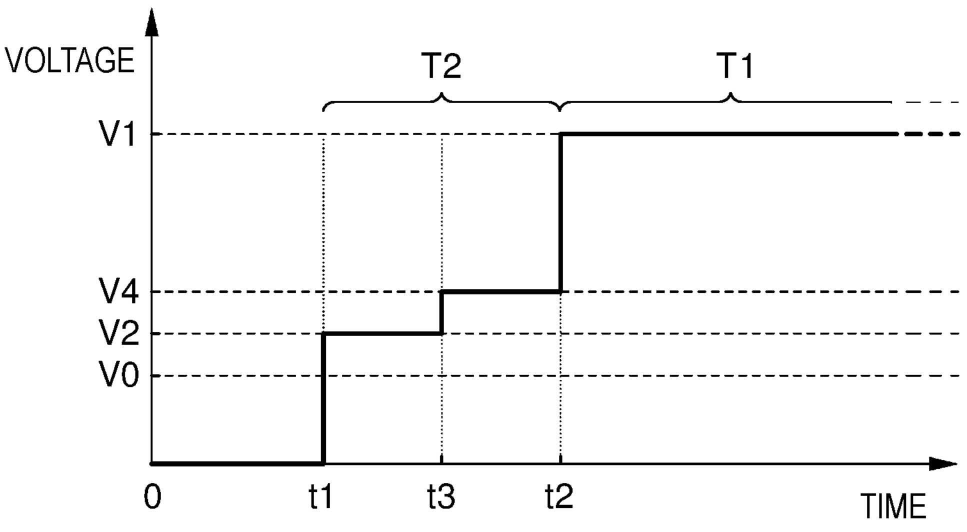
FIG. 8B is a graph illustrating an electric signal given from the fan control system to the fan motor according to the modification of the first exemplary embodiment.

Further, the DC voltage applied to fan motor 22 in the second mode may change instead of a constant value (fixed value) in a period during which controller 11 selects the second mode. For example, as illustrated in FIGS. 8A and 8B, the DC voltage may change in period T2 in which the second mode is selected. FIGS. 8A and 8B are graphs illustrating an electric signal (DC voltage) given from fan control system 10 to fan motor 22 at the time of starting fan motor 22. In FIGS. 8A and 8B, the horizontal axis represents time, and the vertical axis represents voltage.

That is, in the modification illustrated in FIG. 8A, by the idling function of controller 11, the DC voltage applied to fan motor 22 in the second mode continuously increases with time from voltage V2 at time point t1 when fan motor 22 starts. At time point t2 when the determination condition is satisfied, the mode is switched from the second mode to the first mode, so that the DC voltage applied to fan motor 22 is switched to first voltage V1.

In the modification illustrated in FIG. 8B, by the idling function of controller 11, the DC voltage applied to fan motor 22 in the second mode increases stepwise (discretely) with the lapse of time from voltage V2 at time point t1 when fan motor 22 starts. That is, at time point t3 until time point t2 at which the determination condition is satisfied, the DC voltage applied to fan motor 22 discontinuously switches from voltage V2 to voltage V4. At time point t2 when the determination condition is satisfied, the mode is switched from the second mode to the first mode, so that the DC voltage applied to fan motor 22 is switched to first voltage V1.

First voltage V1 applied to fan motor 22 in the first mode may be set in a range higher than second voltage V2, and is not limited to the rated voltage of fan motor 22.

Fan control system 10 in the present disclosure includes a computer system. The computer system mainly includes a processor and a memory as hardware. A processor executes a program recorded in a memory of a computer system to implement a function as fan control system 10 in the present disclosure. The program may be recorded in advance in the memory of the computer system, may be provided through a telecommunication line, or may be provided by being recorded in a non-transitory recording medium readable by the computer system, such as a memory card, an optical disk, or a hard disk drive. The processor of the computer system includes one or a plurality of electronic circuits including a semiconductor integrated circuit (IC) or a large-scale integration (LSI). The integrated circuit such as the IC or the LSI in this disclosure is called differently depending on a degree of integration, and includes an integrated circuit called a system LSI, a very large scale integration (VLSI), or an ultra large scale integration (ULSI). Further, a field-programmable gate array (FPGA) programmed after manufacture of LSI, and a logical device capable of reconfiguring a joint relationship in LSI or reconfiguring circuit partitions in LSI can also be used as processors. The plurality of electronic circuits may be integrated into one chip or may be provided in a distributed manner on a plurality of chips. The plurality of chips may be aggregated in one device or may be provided in a distributed manner in a plurality of devices. The computer system in this disclosure includes a microcontroller having at least one processor and at least one memory. Therefore, the microcontroller also includes one or a plurality of electronic circuits including a semiconductor integrated circuit or a large-scale integrated circuit.

In addition, it is not an essential configuration for fan control system 10 that at least some functions of fan control system 10 are integrated in one housing. The components of fan control system 10 may be provided in a plurality of housings in a distributed manner. Conversely, all functions of fan control system 10 may be aggregated within one housing.

The application of active ingredient generation system 1 is not limited to an in-vehicle application, and active ingredient generation system 1 may be used in, for example, a refrigerator, a washing machine, a dryer, an air conditioner, an electric fan, an air cleaner, a humidifier, a facial treatment device, or the like used in a house, an office, or the like.

In addition, it is not essential for fan motor 22 to include a direct current (DC) brushless motor as a main configuration, and fan motor 22 may be, for example, a brushed direct current (DC) motor, an alternating current (AC) motor that operates when an alternating current voltage is applied, or the like. In a case where fan motor 22 mainly includes an AC motor, the electric signal that fan control system 10 gives to fan motor 22 is not a DC voltage but an AC voltage. Therefore, fan control system 10 may control fan motor 22 by changing the amplitude, frequency, or phase of the AC voltage as the electric signal.

In addition, fan control system 10 may give an electric signal to fan motor 22 separately from the power for driving fan motor 22. In this case, the electric signal is, for example, a communication signal that transmits information by changing (modulating) the amplitude, frequency, phase, or the like of the carrier wave, and is transmitted from fan control system 10 to fan motor 22 by an appropriate communication means of wired communication or wireless communication.

The determination condition for controller 11 to start the first mode in the idling function may not include both the time condition and the temperature condition. That is, the determination condition may include only the time condition or only the temperature condition. When the determination condition includes only the time condition, controller 11 starts the first mode when the time condition is satisfied regardless of the temperature of impregnated bearing 103. In a case where the determination condition includes only the temperature condition, controller 11 starts the first mode when the temperature condition is satisfied regardless of the elapsed time after the start of fan motor 22.

Further, controller 11 may obtain a logical product of the time condition and the temperature condition to use the logical product as the determination condition. In this case, controller 11 determines that the determination condition is satisfied when both the time condition and the temperature condition are satisfied.

First temperature sensor 221 is not essential to fan system 100, and can be omitted as appropriate. Similarly, second temperature sensor 28 is not an essential component of active ingredient generation system 1, and can be omitted as appropriate.

First temperature sensor 221 is not limited to the configuration that detects the temperature of shaft 225 or the temperature of the inner space of cylindrical portion 224. For example, first temperature sensor 221 may be accommodated in housing 223, and may indirectly detect the temperature of impregnated bearing 103 by detecting the temperature in housing 223. Alternatively, first temperature sensor 221 may directly detect the temperature of impregnated bearing 103, for example.

In addition, second temperature sensor 28 is not limited to the configuration that detects the temperature of circuit board 230 or the temperature of the inner space of case 3. For example, second temperature sensor 28 may be provided separately from active ingredient generation system 1, and may indirectly detect the ambient temperature of fan motor 22 by detecting the temperature outside case 3. Alternatively, second temperature sensor 28 may be attached to fan motor 22 to directly detect the ambient temperature of fan motor 22, for example.

One temperature sensor may be shared by first temperature sensor 221 and second temperature sensor 28. That is, for example, by detecting both the temperature of impregnated bearing 103 and the ambient temperature of fan motor 22 with one temperature sensor mounted on circuit board 230, one temperature sensor may be substituted for first temperature sensor 221 and second temperature sensor 28.

In addition, the switching timing from the second mode to the first mode is not limited to the timing at which the determination condition is satisfied, and may be, for example, after a certain period of time elapses from the timing at which the determination condition is satisfied. In this case, the first mode is started after a certain period of time elapses since the determination condition is satisfied, in other words, a time lag can be given until the first mode is actually started after the determination condition is satisfied.

In addition, voltage conversion circuit 13 is not limited to a dropper type power supply circuit such as a series regulator, and may be realized by, for example, a switching type power supply circuit such as a step-down chopper circuit.

In addition, discharge electrode 211 and counter electrode 212 are not limited to a titanium alloy (Ti alloy), and may be a copper alloy such as a copper-tungsten alloy (Cu—W alloy) as an example. In addition, discharge electrode 211 is not limited to a tapered shape, and may have, for example, a shape in which a distal end bulges.

In addition, the high voltage applied from drive circuit 23 to discharger 21 is not limited to about 6.0 kV, and is appropriately set according to, for example, the shapes of discharge electrode 211 and counter electrode 212, the distance between discharge electrode 211 and counter electrode 212, or the like.

The fixing structure of internal components 2 is not limited to the structure described in the first exemplary embodiment. For example, the fixing of circuit board 230 to fixing portion 61 is not limited to the configuration realized using fasteners such as screw 71 and nut 72, and may be realized by, for example, caulking, adhesion, snap-fit, or the like. The bonding includes bonding using an adhesive, an adhesive tape, or the like.

Liquid supply unit 24 is not essential to active ingredient generation system 1, and may be omitted as appropriate. In this case, discharger 21 generates active ingredients such as negative ions by discharge (full path breakdown discharge or partial breakdown discharge) generated between discharge electrode 211 and counter electrode 212.

Liquid supply unit 24 is not limited to the configuration in which discharge electrode 211 is cooled to generate dew condensation water on discharge electrode 211 as in the first exemplary embodiment. Liquid supply unit 24 may be configured to supply liquid from the tank to discharge electrode 211 using, for example, a capillary phenomenon or a supply mechanism such as a pump. Further, liquid is not limited to water (including dew condensation water), and may be a liquid other than water.

Drive circuit 23 may be configured to apply a high voltage between discharge electrode 211 and counter electrode 212 with discharge electrode 211 as a positive electrode and counter electrode 212 as a negative electrode (ground). Further, since a potential difference (voltage) only needs to be generated between discharge electrode 211 and counter electrode 212, drive circuit 23 may apply a negative voltage to discharger 21 by setting an electrode (positive electrode) on a high potential side to a ground and setting an electrode (negative electrode) on a low potential side to a negative potential.

Moreover, in a comparison between two values, "more than or equal to" includes both a case where the two values are equal and a case where one of the two values exceeds the other. However, the present disclosure is not limited to this definition, and "more than or equal to" herein may be synonymous with "more than" including only a case where one of the two values exceeds the other. That is, whether the case of two values equal to each other is included may be changed in any manner depending on settings of thresholds and the like. Accordingly, which of "more than or equal to" and "more than" is used does not produce a technical difference. Similarly, "less than" may be synonymous with "less than or equal to".

Second Exemplary Embodiment

Fan control system 10 according to the present exemplary embodiment is different from fan control system 10 according to the first exemplary embodiment in that a plurality of control modes selectable by controller 11 include a third mode. Hereinafter, the similar configurations to those of the first exemplary embodiment are denoted by the same reference numerals, and the description thereof will be appropriately omitted.

The third mode is a control mode in which an electric signal is given to fan motor 22 so that fan motor 22 operates at a third rotation speed higher than the second rotation speed and with a torque equal to or larger than a start torque which is a minimum torque necessary for starting fan motor 22. Controller 11 has a function (hereinafter, referred to as a "starting function") of selecting the third mode in a period after the start of fan motor 22 and before the selection of the second mode. In short, since controller 11 selects the third mode and the second mode in this order in a period after the start of fan motor 22 and before the selection of the first mode by the starting function, switching from the third mode to the second mode is performed at a certain switching timing. That is, according to the starting function of controller 11, controller 11 first selects the third mode as the control mode after the start of fan motor 22, and then switches the control mode to be selected from the third mode to the second mode at a certain switching timing. Here, as an example, the switching timing from the third mode to the second mode is a timing when a predetermined start time (for example, about several tens of milliseconds to several seconds) has elapsed from the start time of the third mode.

The third mode is a control mode in which an electric signal that causes fan motor 22 to operate at the third rotation speed is given to fan motor 22, and the rotation speed of fan motor 22 in the third mode is not necessarily the third rotation speed. Therefore, in the third mode, fan control system 10 ideally gives an electric signal set so that fan motor 22 operates at the third rotation speed to fan motor 22, and the electric signal (DC voltage) at this time is defined as "third voltage V3".

In the present exemplary embodiment, third voltage V3 is higher than second voltage V2 applied to fan motor 22 in the second mode and lower than first voltage V1 applied to fan motor 22 in the first mode.

Figure 9:
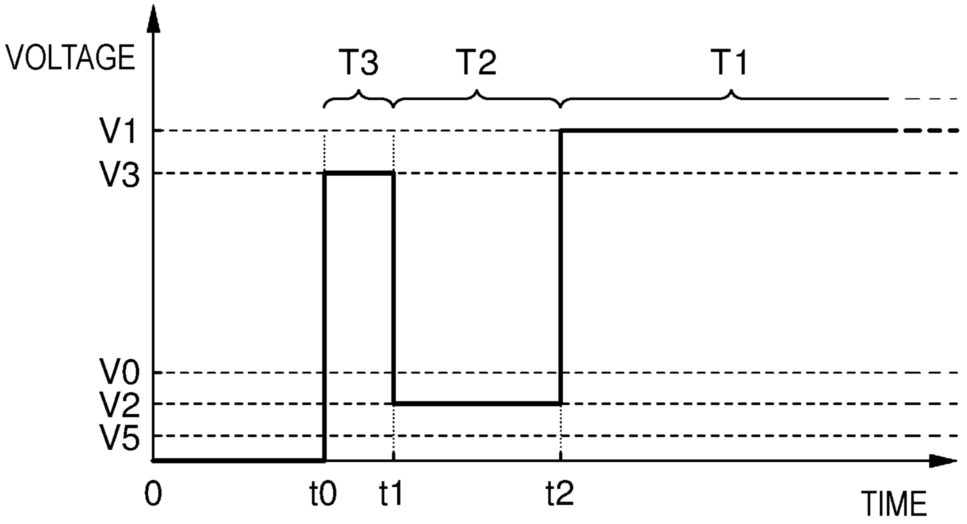
FIG. 9 is a graph illustrating an electric signal given from a fan control system to a fan motor according to a second exemplary embodiment.

That is, according to fan control system 10 of the present exemplary embodiment, the DC voltage applied to fan motor 22 changes as illustrated in FIG. 9. FIG. 9 is a graph illustrating an electric signal (DC voltage) given from fan control system 10 to fan motor 22 when fan motor 22 is started. In FIG. 9, the horizontal axis represents time, and the vertical axis represents voltage.

In short, controller 11 first selects the third mode at the time of starting fan motor 22 by the starting function. In the present exemplary embodiment, controller 11 selects the third mode at time point t0 when energization to fan motor 22 is started and fan motor 22 is started. Thereafter, the controller 11 switches from the third mode to the second mode at time point t1 when the start time has elapsed. That is, in FIG. 9, time point t0 is the time of starting fan motor 22, and time point t1 is the timing when the starting time has elapsed from time point t0. Therefore, controller 11 selects the third mode in period T3 from time point t0 to time point t1, and selects the second mode in period T2 after time point t1.

Therefore, in period T1 in which the third mode is selected, third voltage V3 is applied to fan motor 22 so that fan motor 22 starts at the third rotation speed higher than the second rotation speed. That is, in period T3 for starting fan motor 22, third voltage V3 higher than second voltage V2 is applied to fan motor 22, so that the start of fan motor 22 is facilitated.

On the other hand, in period T2 in which the second mode is selected, second voltage V2 is applied to fan motor 22 so that fan motor 22 operates at the second rotation speed lower than the third rotation speed. That is, in period T2 after the start of fan motor 22, second voltage V2 lower than third voltage V3 is applied to fan motor 22, so that the rotation speed of fan motor 22 is suppressed to be lower than the rotation speed at the start. The subsequent operation is similar to the operation of fan control system 10 according to the first exemplary embodiment.

Here, in the present exemplary embodiment, since fan motor 22 is started in the third mode, third voltage V3 is equal to or higher than minimum start voltage V0 necessary for starting fan motor 22. On the other hand, in the second mode, since it is sufficient to maintain the rotation of fan motor 22 so that the already started fan motor 22 does not stop, second voltage V2 is equal to or higher than minimum voltage (hereinafter, referred to as "minimum maintaining voltage") V5 necessary for maintaining the rotation of the started fan motor 22. That is, minimum maintaining voltage V5 is a voltage lower than minimum start voltage V0. When the DC voltage applied to the started fan motor 22 is equal to or higher than minimum maintaining voltage V5, fan motor 22 continues to rotate, and when the DC voltage becomes lower than minimum maintaining voltage V5, fan motor 22 stops.

In the present exemplary embodiment, since the start of fan motor 22 is performed in the third mode, second voltage V2 is set in a range lower than minimum start voltage V0 and equal to or higher than minimum maintaining voltage V5. In other words, in the second mode, the fan motor is operated with a torque less than the start torque and equal to or larger than the maintenance torque that is the minimum torque necessary for maintaining the rotation of rotor 101 in fan motor 22 after the start. In the example of FIG. 9, second voltage V2 is set to be lower than minimum start voltage V0 and higher than minimum maintaining voltage V5.

Figure 10:
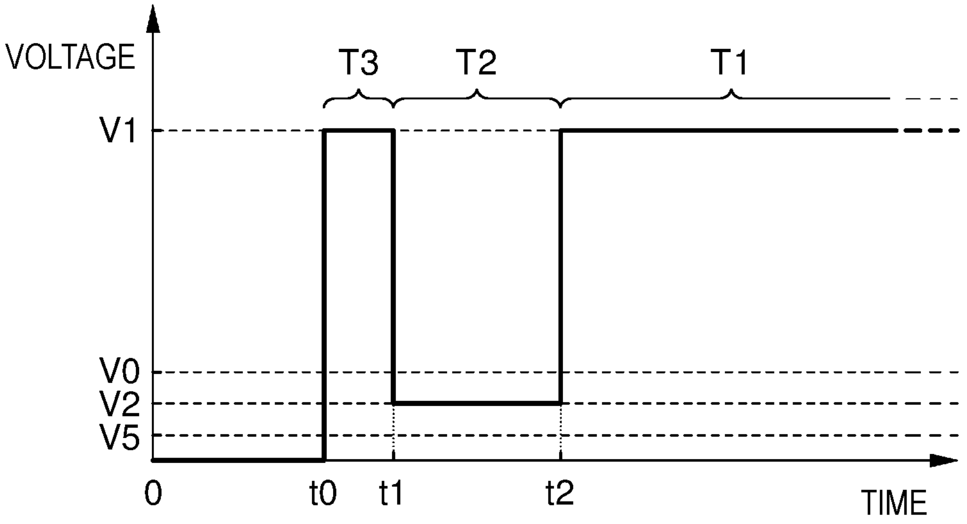
FIG. 10 is a graph illustrating an electric signal given from a fan control system to a fan motor according to a modification of the second exemplary embodiment.

As a modification of the second exemplary embodiment, as illustrated in FIG. 10, the third voltage applied to fan motor 22 in the third mode may have the same value as first voltage V1 applied to fan motor 22 in the first mode. That is, in the present modification, the electric signals given to fan motor 22 in the first mode and the third mode are the same. In this case, when fan motor 22 is started, the DC voltage applied to fan motor 22 becomes first voltage V1 which is the rated voltage in the third mode, decreases to second voltage V2 in the second mode, and then returns to first voltage V1 in the first mode. In the present modification, the DC voltage applied to fan motor 22 may be switched in two stages.

As another modification of the second exemplary embodiment, the DC voltage applied to fan motor 22 in the third mode may change instead of a constant value (fixed value) in a period in which controller 11 selects the third mode.

In the second exemplary embodiment, the DC voltage (second voltage V2) applied to fan motor 22 in the second mode may be equal to or higher than minimum start voltage V0.

Various configurations (including the modification) described in the second exemplary embodiment can be used by appropriately combining with various configurations (including the modification) described in the first exemplary embodiment.

Conclusion

As described above, the fan control system (10) according to the first aspect is a fan control system (10) that controls a fan motor (22). The fan motor (22) includes a rotor (101) including blades (104), a stator (102), and an impregnated bearing (103) impregnated with a lubricant (105), and the impregnated bearing (103) rotatably holds the rotor (101). The fan control system (10) includes a controller (11) that selects a control mode from a plurality of control modes including a first mode and a second mode. The first mode is a control mode in which an electric signal is given to the fan motor (22) so that the fan motor (22) operates at a first rotation speed. The second mode is a control mode in which an electric signal is given to the fan motor (22) so that the fan motor (22) operates at a second rotation speed lower than the first rotation speed. The controller (11) has a function of selecting the second mode in a period after the start of the fan motor (22) and before the selection of the first mode.

According to this aspect, by the function of the controller (11), the second mode is selected in a period after the start of the fan motor (22) and before the selection of the first mode. Therefore, before the fan motor (22) operates at the first rotation speed, the fan motor (22) operates at the second rotation speed lower than the first rotation speed. Therefore, for example, even under a special environment such as a low temperature environment, the impregnated bearing (103) is warmed while the fan motor (22) operates at the second rotation speed, and a defect such as abnormal noise due to contraction of the lubricant (105) is less likely to occur.

In a fan control system (10) according to a second aspect, the plurality of control modes in the first aspect include a third mode. The third mode is a control mode in which an electric signal is given to the fan motor (22) such that the fan motor (22) operates at a third rotation speed higher than the second rotation speed and with a torque equal to or higher than a start torque which is a minimum torque necessary for starting the fan motor (22). The controller (11) further has a function of selecting the third mode in a period after the start of the fan motor (22) and before the selection of the second mode.

According to this aspect, the start of the fan motor (22) is facilitated.

In a fan control system (10) according to a third aspect, in the second aspect, the fan motor (22) in the second mode is operated with a torque that is less than the start torque and equal to or larger than the maintenance torque that is the minimum torque necessary for maintaining the rotation of the rotor (101) in the fan motor (22) after the start.

According to this aspect, in the second mode, the torque of the fan motor (22) can be reduced to less than the start torque, and a defect such as abnormal noise caused by contraction of the lubricant (105) is less likely to occur.

In a fan control system (10) according to a fourth aspect, in the second or third aspect, the electric signals given to the fan motor (22) in the first mode and the third mode are the same.

According to this aspect, the circuit configuration can be simplified as compared with the case where different electric signals are used in the first mode and the third mode.

In a fan control system (10) according to a fifth aspect, in the first or second aspect, in the second mode, the fan motor (22) is operated with a torque equal to or larger than a start torque that is a minimum torque necessary for starting the fan motor (22).

According to this aspect, the fan motor (22) can be easily started even in the second mode.

In a fan control system (10) according to a sixth aspect, in any one of the first to fifth aspects, the determination condition for the controller (11) to start the first mode includes a time condition related to an elapsed time after the start of the fan motor (22).

According to this aspect, switching from the second mode to the first mode can be realized by a simple configuration such as a timer.

In a fan control system (10) according to a seventh aspect, in any one of the first to sixth aspects, the determination condition for the controller (11) to start the first mode includes a temperature condition related to a temperature of the impregnated bearing (103).

According to this aspect, the switching from the second mode to the first mode can be realized not for a certain period of time but according to the temperature of the impregnated bearing (103), and the impregnated bearing is resistant to disturbance.

A fan control system (10) according to an eighth aspect further includes a switch (12) in any one of the first to seventh aspects. The switch (12) switches a function of selecting the second mode of the controller (11) between enabled or disabled. The switch (12) disables the function of selecting the second mode based on at least the environmental information on the ambient temperature of the fan motor (22).

According to this aspect, for example, the function of selecting the second mode in a situation where the function of selecting the second mode is unnecessary, such as a case where the ambient temperature of the fan motor (22) is sufficiently high, is disabled, and the startability of the fan motor (22) can be improved.

In a fan control system (10) according to a ninth aspect, in any one of the first to eighth aspects, the electric signal is a DC voltage applied to the fan motor (22).

According to this aspect, control of the fan motor (22) is simplified.

In a fan control system (10) according to a tenth aspect, in any one of the first to ninth aspects, the fan motor (22) is used as an air blowing unit that generates an air flow for releasing an active ingredient in an active ingredient generation system including a discharger that generates the active ingredient. The generation amount of the active ingredient per unit time in the discharger is smaller during the selection of the second mode than during the selection of the first mode.

According to this aspect, it is possible to suppress the influence on the generation of the active ingredient to be small while suppressing the rotation speed of the fan motor (22) in the second mode at the time of starting the fan motor (22).

A fan system according to an eleventh aspect includes the fan control system (10) according to any one of the first to tenth aspects and the fan motor (22).

According to this aspect, for example, even under a special environment such as a low temperature environment, the impregnated bearing (103) is warmed while the fan motor (22) is operated at the second rotation speed, and defects such as abnormal noise resulting from contraction of the lubricant (105) are less likely to occur.

An active ingredient generation system according to a twelfth aspect includes the fan system according to the eleventh aspect and a discharger that generates an active ingredient. The fan motor (22) generates an air flow for releasing the active ingredient.

According to this aspect, for example, even under a special environment such as a low temperature environment, the impregnated bearing (103) is warmed while the fan motor (22) is operated at the second rotation speed, and defects such as abnormal noise resulting from contraction of the lubricant (105) are less likely to occur.

A fan control method according to a thirteenth aspect is a fan control method for controlling a fan motor (22), in which a control mode can be selected from a plurality of control modes including a first mode and a second mode. The fan motor (22) includes a rotor (101) including blades (104), a stator (102), and an impregnated bearing (103) impregnated with a lubricant (105), and the impregnated bearing (103) rotatably holds the rotor (101). The first mode is a control mode in which an electric signal is given to the fan motor (22) so that the fan motor (22) operates at a first rotation speed. The second mode is a control mode in which an electric signal is given to the fan motor (22) so that the fan motor (22) operates at a second rotation speed lower than the first rotation speed. The fan control method includes a process of selecting the second mode in a period from the start of the fan motor (22) to the selection of the first mode.

According to this aspect, for example, even under a special environment such as a low temperature environment, the impregnated bearing (103) is warmed while the fan motor (22) is operated at the second rotation speed, and defects such as abnormal noise resulting from contraction of the lubricant (105) are less likely to occur.

A program according to a fourteenth aspect is a program for causing one or more processors to execute the fan control method according to the thirteenth aspect.

According to this aspect, for example, even under a special environment such as a low temperature environment, the impregnated bearing (103) is warmed while the fan motor (22) is operated at the second rotation speed, and defects such as abnormal noise resulting from contraction of the lubricant (105) are less likely to occur.

The configuration according to the second to tenth aspect is not essential to the fan control system (10), and can be omitted as appropriate.

Reference Marks in the Drawings

10 fan control system
11 controller
12 switch
22 fan motor
101 rotor
102 stator
103 impregnated bearing
104 blade
105 lubricant

The invention claimed is:

1. A fan control system for controlling a fan motor that includes a rotor including blades, a stator, and an impregnated bearing impregnated with a lubricant and rotatably holds the rotor by the impregnated bearing, the fan control system comprising:

a controller configured to select a control mode from a plurality of control modes including a first mode to operate at a first rotation speed, a second mode to operate at a second rotation speed lower than the first rotation speed, and a third mode to operate at a third rotation speed higher than the second rotation speed and with a torque equal to or larger than a start torque that is a minimum torque necessary for starting the fan motor; and a voltage conversion circuit for providing a first voltage to the fan motor in the first mode, a second voltage lower than the first voltage to the fan motor in the second mode and a third voltage higher than the second voltage to the fan motor in the third mode, wherein the controller is configured to:

cause the voltage conversion circuit to provide the third voltage to the fan motor to start the fan motor, after a predetermined time has passed, cause the voltage conversion circuit to switch the third voltage to the second voltage and provide the second voltage to the fan motor, and after a predetermined condition is met, cause the voltage conversion circuit to switch the second voltage to the first voltage and provide the first voltage to the fan motor.

2. The fan control system according to claim 1, wherein the controller is configured to cause the voltage conversion circuit to provide the second voltage in the second mode, such that the fan motor is operated with a torque less than the start torque and equal to or larger than a maintenance torque that is a minimum torque necessary for maintaining rotation of the rotor in the fan motor after the starting the fan motor.

3. The fan control system according to claim 1, wherein the third voltage is equal the first voltage.

4. The fan control system according to claim 1, wherein the controller is configured to cause the voltage conversion circuit to provide the second voltage in the second mode, such that the fan motor is operated with a torque equal to or larger than the start torque.

5. The fan control system according to claim 1, wherein the predetermined condition includes a time condition related to an elapsed time after the starting the fan motor.

6. The fan control system according to claim 1, wherein the predetermined condition includes a temperature condition related to a temperature of the impregnated bearing.

7. The fan control system according to claim 1, wherein each of the first, second and third voltages is a DC voltage.

8. The fan control system according to claim 1, wherein;

the fan motor is used as an air blowing unit that generates an air flow for releasing an active ingredient in an active ingredient generation system including a discharger that generates the active ingredient, and an amount of the active ingredient generated per unit time by the discharger is smaller during the selection of the second mode than during the selection of the first mode.

9. The fan control system according to claim 8, wherein the active ingredient is one of an OH radical, an $O_2$ radical, a charged fine particle liquid containing an OH radical, a negative ion, or a positive ion.

10. A fan system comprising:

the fan control system according to claim 1; and the fan motor.

11. An active ingredient generation system comprising:

the fan system according to claim 10; and a discharger configured to generate an active ingredient, wherein the fan motor generates an air flow for releasing the active ingredient.

12. A fan control system for controlling a fan motor that includes a rotor including blades, a stator, and an impregnated bearing impregnated with a lubricant and rotatably holds the rotor by the impregnated bearing, the fan control system comprising:

a controller configured to select a control mode from a plurality of control modes including a first mode to operate at a first rotation speed, and a second mode to operate at a second rotation speed lower than the first rotation speed;

a voltage conversion circuit for providing a first voltage to the fan motor in the first mode, and a second voltage lower than the first voltage to the fan motor in the second mode; and a switch configured to switch between enabling and disabling of a function of selecting the second mode of the controller, wherein the switch is configured to disable the function of selecting the second mode based on at least environmental information related to an ambient temperature of the fan motor, the controller is configured to:

when the switch does not disable the function of selecting the second mode, cause the voltage conversion circuit to provide the second voltage to the fan motor without selecting the first mode upon or after a start of the fan motor, and after a predetermined condition is met, cause the voltage conversion circuit to switch the second voltage to the first voltage and provide the first voltage to the fan motor, and when the switch disables the function of selecting the second mode, cause the conversion circuit to provide the first voltage to the fan motor upon the start of the fan motor.

13. A fan control method for controlling a fan motor that includes a rotor including blades, a stator, and an impregnated bearing impregnated with a lubricant and rotatably holds the rotor by the impregnated bearing, wherein the fan motor is operated in one of:

a first mode to operate at a first rotation speed, a second mode to operate at a second rotation speed lower than the first rotation speed, a third mode to operate at a third rotation speed higher than the second rotation speed and with a torque equal to or larger than a start torque that is a minimum torque necessary for starting the fan motor, the fan control method comprising:

selecting the third mode upon a start of the fan motor;

after a predetermined time has passed, switching the third mode to the second mode; and after a predetermined condition is met, switching the second mode to the first mode, wherein the first mode is not selected before the second mode is selected after the start of the fan motor.

14. A non-transitory recording medium storing a program, wherein the program, when executed by one or more processors, causes the one or more processors to execute the fan control method according to claim 13.

15. The fan control method according to claim 13, wherein in the second mode, the fan motor is operated with a torque less than the start torque and equal to or larger than a maintenance torque that is a minimum torque necessary for maintaining rotation of the rotor in the fan motor after the start of the fan motor.

16. The fan control method according to claim 13, wherein a voltage applied to the fan motor in the third mode is equal a voltage applied to the fan motor in the first mode.

17. The fan control method according to claim 13, wherein in the second mode, the fan motor is operated with a torque equal to or larger than the start torque.

18. The fan control method according to claim 13, wherein the predetermined condition includes a time condition related to an elapsed time after the start of the fan motor.

19. The fan control method according to claim 13, wherein the predetermined condition includes a temperature condition related to a temperature of the impregnated bearing.

* * * * *